(12) United States Patent
Dale et al.

(10) Patent No.: US 9,039,792 B2
(45) Date of Patent: May 26, 2015

(54) METHODS FOR PRODUCING AND USING DENSIFIED BIOMASS PRODUCTS CONTAINING PRETREATED BIOMASS FIBERS

(71) Applicant: BOARD OF TRUSTEES OF MICHIGAN STATE UNIVERSITY, East Lansing, MI (US)

(72) Inventors: Bruce E. Dale, Mason, MI (US); Bryan Ritchie, Okemos, MI (US); Derek Marshall, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 13/835,766

(22) Filed: Mar. 15, 2013

(65) Prior Publication Data

US 2013/0280762 A1    Oct. 24, 2013

Related U.S. Application Data

(62) Division of application No. 13/202,011, filed as application No. PCT/US2010/046525 on Aug. 24, 2010, now Pat. No. 8,673,031.

(60) Provisional application No. 61/236,403, filed on Aug. 24, 2009.

(51) Int. Cl.
| | | |
|---|---|---|
| *C10L 5/40* | (2006.01) | |
| *D21B 1/02* | (2006.01) | |
| *A23K 1/14* | (2006.01) | |
| *C10L 5/36* | (2006.01) | |
| *C10L 5/44* | (2006.01) | |

(52) U.S. Cl.
CPC ............... *D21B 1/021* (2013.01); *A23K 1/146* (2013.01); *C10L 5/363* (2013.01); *C10L 5/44* (2013.01); *Y02E 50/10* (2013.01); *Y02E 50/30* (2013.01)

(58) Field of Classification Search
CPC ........... C10L 5/363; C10L 5/44; Y02E 50/10; Y02E 50/30; D21B 1/021
USPC .............................. 44/550, 589, 590, 605, 606
See application file for complete search history.

(56) References Cited

U.S. PATENT DOCUMENTS

| | | |
|---|---|---|
| 2,017,779 A | 10/1935 | Vosburgh |
| 2,548,192 A | 4/1951 | Berg |
| 3,306,006 A | 2/1967 | Urban |
| 3,707,436 A | 12/1972 | O'Connor |
| 3,920,419 A | 11/1975 | Schroeder et al. |
| 4,064,276 A | 12/1977 | Conradsen et al. |
| 4,153,435 A | 5/1979 | Fischer |
| 4,263,744 A | 4/1981 | Stoller |
| 4,287,162 A | 9/1981 | Scheibel |
| 4,356,196 A | 10/1982 | Hultquist |
| 4,370,351 A | 1/1983 | Harper |
| 4,461,648 A | 7/1984 | Foody |
| 4,526,791 A | 7/1985 | Young |
| 4,581,044 A | 4/1986 | Uno et al. |
| 4,589,334 A | 5/1986 | Andersen |
| 4,594,131 A | 6/1986 | Maier |
| 4,600,590 A | 7/1986 | Dale |
| 4,624,805 A | 11/1986 | Lawhon |
| 4,644,060 A | 2/1987 | Chou |
| 4,848,026 A | 7/1989 | Dunn-Coleman et al. |
| 4,986,835 A | 1/1991 | Uno et al. |
| 4,995,888 A | 2/1991 | Beaupre et al. |
| 5,025,635 A | 6/1991 | Rockenfeller et al. |
| 5,037,663 A | 8/1991 | Dale |
| 5,047,332 A | 9/1991 | Chahal |
| 5,114,694 A | 5/1992 | Grotz, Jr. |
| 5,171,592 A | 12/1992 | Holtzapple et al. |
| 5,370,999 A | 12/1994 | Stuart |
| 5,473,061 A | 12/1995 | Bredereck et al. |
| 5,660,603 A | 8/1997 | Elliot et al. |
| 5,736,032 A | 4/1998 | Cox et al. |
| 5,865,898 A | 2/1999 | Holtzapple et al. |
| 5,939,544 A | 8/1999 | Karstens et al. |
| 6,027,552 A | 2/2000 | Ruck et al. |
| 6,106,888 A | 8/2000 | Dale et al. |
| 6,176,176 B1 | 1/2001 | Dale et al. |
| 6,255,505 B1 | 7/2001 | Bijl et al. |
| 6,416,621 B1 | 7/2002 | Karstens |
| 6,425,939 B1 | 7/2002 | Moreau et al. |
| 6,444,437 B1 | 9/2002 | Sporleder et al. |
| 6,524,848 B2 | 2/2003 | McNelly |
| 6,585,807 B2 | 7/2003 | Umino et al. |
| 6,620,292 B2 | 9/2003 | Wingerson |
| 6,872,296 B2 | 3/2005 | Kim |
| 6,893,484 B2 | 5/2005 | Thomas |
| 7,049,485 B2 | 5/2006 | Sticklen et al. |
| 7,187,176 B2 | 3/2007 | Lim et al. |
| 7,250,074 B2 | 7/2007 | Tonkovich et al. |
| 7,371,926 B2 | 5/2008 | Sticklen et al. |
| 7,371,962 B2 | 5/2008 | Zuppero et al. |
| 7,494,675 B2 | 2/2009 | Abbas et al. |
| 7,494,792 B2 | 2/2009 | Warzywoda et al. |

(Continued)

FOREIGN PATENT DOCUMENTS

| | | |
|---|---|---|
| AU | 756976 B2 | 1/2003 |
| CA | 2368872 A1 | 10/2000 |

(Continued)

OTHER PUBLICATIONS

Kumar et al, Methods for Pretreatment of Lignocellulosic Biomass, Ind. Eng. Chem. Res., Mar. 20, 2009, pp. A-Q.*

(Continued)

*Primary Examiner* — Cephia D Toomer
(74) *Attorney, Agent, or Firm* — Clark IP Law, PLC

(57) ABSTRACT

A process is provided comprising subjecting a quantity of plant biomass fibers to a pretreatment to cause at least a portion of lignin contained within each fiber to move to an outer surface of said fiber, wherein a quantity of pretreated tacky plant biomass fibers is produced; and densifying the quantity of pretreated tacky plant biomass fibers to produce one or more densified biomass particulates, wherein said biomass fibers are densified without using added binder.

46 Claims, 6 Drawing Sheets

(56) References Cited

U.S. PATENT DOCUMENTS

| | | | |
|---|---|---|---|
| 7,537,744 B2 | 5/2009 | Benderly et al. |
| 7,585,652 B2 | 9/2009 | Foody et al. |
| 7,771,565 B2 | 8/2010 | Kirov et al. |
| 7,910,338 B2 | 3/2011 | Hennessey et al. |
| 7,910,675 B2 | 3/2011 | Funk et al. |
| 7,915,017 B2 | 3/2011 | Dale |
| 7,937,851 B2 | 5/2011 | Rajagopalan et al. |
| 8,020,342 B2 | 9/2011 | Karpik |
| 8,030,030 B2 | 10/2011 | Varanasi et al. |
| 8,367,378 B2 | 2/2013 | Balan et al. |
| 8,394,177 B2 | 3/2013 | Campbell et al. |
| 8,394,611 B2 | 3/2013 | Dale et al. |
| 8,419,900 B2 | 4/2013 | Baba et al. |
| 8,444,925 B2 | 5/2013 | Baba |
| 8,551,549 B2 | 10/2013 | Zeeck |
| 8,651,403 B2 | 2/2014 | Camp et al. |
| 8,673,031 B2 | 3/2014 | Dale et al. |
| 8,771,425 B2 | 7/2014 | Dale |
| 8,846,123 B2 | 9/2014 | Zeeck |
| 2003/0044951 A1 | 3/2003 | Sporleder et al. |
| 2005/0064577 A1 | 3/2005 | Berzin |
| 2005/0233423 A1 | 10/2005 | Berka et al. |
| 2006/0014260 A1 | 1/2006 | Fan et al. |
| 2006/0130396 A1 | 6/2006 | Werner |
| 2006/0177917 A1 | 8/2006 | Warzywoda et al. |
| 2007/0029252 A1 | 2/2007 | Dunson, Jr. et al. |
| 2007/0031918 A1 | 2/2007 | Dunson, Jr. et al. |
| 2007/0037259 A1 | 2/2007 | Hennessey et al. |
| 2007/0113736 A1 | 5/2007 | Bandosz |
| 2007/0192900 A1 | 8/2007 | Sticklen |
| 2007/0202214 A1 | 8/2007 | Lewis et al. |
| 2007/0227063 A1 | 10/2007 | Dale et al. |
| 2007/0287795 A1 | 12/2007 | Huda et al. |
| 2008/0008783 A1 | 1/2008 | Dale |
| 2008/0057555 A1 | 3/2008 | Nguyen |
| 2008/0087165 A1 | 4/2008 | Wright et al. |
| 2008/0115415 A1 | 5/2008 | Agrawal et al. |
| 2008/0171297 A1 | 7/2008 | Reynolds et al. |
| 2008/0229657 A1 | 9/2008 | Senyk et al. |
| 2008/0256851 A1 | 10/2008 | Lumb |
| 2008/0264254 A1 | 10/2008 | Song et al. |
| 2008/0280236 A1 | 11/2008 | Wright |
| 2009/0011474 A1 | 1/2009 | Balan et al. |
| 2009/0042259 A1 | 2/2009 | Dale et al. |
| 2009/0049748 A1 | 2/2009 | Day et al. |
| 2009/0053770 A1 | 2/2009 | Hennessey et al. |
| 2009/0053771 A1 | 2/2009 | Dale et al. |
| 2009/0061486 A1 | 3/2009 | Edwards et al. |
| 2009/0087898 A1 | 4/2009 | Haase et al. |
| 2009/0093027 A1 | 4/2009 | Balan et al. |
| 2009/0099079 A1 | 4/2009 | Emalfarb et al. |
| 2009/0123361 A1 | 5/2009 | Johannessen |
| 2009/0178671 A1 | 7/2009 | Ahring et al. |
| 2009/0221042 A1 | 9/2009 | Dale et al. |
| 2009/0230040 A1 | 9/2009 | Limcaco |
| 2009/0313976 A1 | 12/2009 | Johannessen et al. |
| 2009/0318670 A1 | 12/2009 | Dale et al. |
| 2010/0159521 A1 | 6/2010 | Cirakovic et al. |
| 2010/0267999 A1 | 10/2010 | Lau et al. |
| 2010/0279361 A1 | 11/2010 | South et al. |
| 2011/0192559 A1 | 8/2011 | Venkatesh et al. |
| 2011/0201091 A1 | 8/2011 | Dale |
| 2011/0290114 A1 | 12/2011 | Campbell et al. |
| 2011/0300269 A1 | 12/2011 | Dale et al. |
| 2012/0064574 A1 | 3/2012 | Tokuyasu et al. |
| 2012/0071308 A1 | 3/2012 | Sekar |
| 2012/0085505 A1 | 4/2012 | Sabourin |
| 2012/0125548 A1 | 5/2012 | Cohen |
| 2012/0125551 A1 | 5/2012 | Cohen et al. |
| 2012/0187228 A1 | 7/2012 | Camp et al. |
| 2012/0325202 A1 | 12/2012 | Dale |
| 2013/0196398 A1 | 8/2013 | Bals et al. |
| 2013/0217073 A1 | 8/2013 | Chundawat et al. |
| 2013/0289268 A1 | 10/2013 | Teymouri et al. |
| 2014/0038243 A1 | 2/2014 | Balan et al. |
| 2014/0227757 A1 | 8/2014 | Jin et al. |

FOREIGN PATENT DOCUMENTS

| | | |
|---|---|---|
| CA | 2573046 A1 | 1/2006 |
| CA | 2610797 A1 | 12/2006 |
| CA | 2752604 A1 | 8/2010 |
| CA | 2762985 C | 7/2013 |
| CA | 2650860 C | 9/2013 |
| CA | 2737704 C | 11/2013 |
| CN | 101223273 A | 7/2008 |
| CN | 102597247 A | 7/2012 |
| CN | 102939388 A | 2/2013 |
| DE | 20301645 U1 | 4/2003 |
| EP | 0144930 A2 | 6/1985 |
| EP | 1247781 A2 | 10/2002 |
| EP | 1533279 A1 | 5/2005 |
| EP | 1690944 A1 | 8/2006 |
| GB | 1310835 A | 3/1973 |
| GB | 1381728 A | 1/1975 |
| GB | 2122864 A | 1/1984 |
| IN | 249187 | 10/2011 |
| IN | 9645/DELNP/2011 A | 2/2013 |
| JP | 2008-161125 A | 7/2008 |
| JP | 2008-535664 A | 9/2008 |
| JP | 2011-160753 A | 8/2011 |
| RU | 2215755 C1 | 11/2003 |
| WO | 85/00133 A1 | 1/1985 |
| WO | 00/61858 A1 | 10/2000 |
| WO | 01/32715 A1 | 5/2001 |
| WO | 02/37981 A2 | 5/2002 |
| WO | 2004/033920 A1 | 4/2004 |
| WO | 2005/091418 A2 | 9/2005 |
| WO | 2006/055362 A1 | 5/2006 |
| WO | 2006/128304 A1 | 12/2006 |
| WO | 2007/005918 A2 | 1/2007 |
| WO | 2007/005918 A3 | 8/2007 |
| WO | 2007/130337 A1 | 11/2007 |
| WO | 2008/020901 A2 | 2/2008 |
| WO | 2008/020901 A3 | 7/2008 |
| WO | 2008/114139 A2 | 9/2008 |
| WO | 2008/114139 A3 | 12/2008 |
| WO | 2009/045527 A1 | 4/2009 |
| WO | 2010/098408 A1 | 9/2010 |
| WO | 2010/121348 A1 | 10/2010 |
| WO | 2010/135679 A1 | 11/2010 |
| WO | 2010/147218 A1 | 12/2010 |
| WO | 2011/028543 A2 | 3/2011 |
| WO | 2011/046818 A2 | 4/2011 |
| WO | 2011/028543 A3 | 6/2011 |
| WO | 2011/080154 A1 | 7/2011 |
| WO | 2011/125056 A1 | 10/2011 |
| WO | 2011/133571 A2 | 10/2011 |
| WO | 2011/133571 A3 | 1/2012 |
| WO | 2012/012594 A1 | 1/2012 |
| WO | 2012/071312 A2 | 5/2012 |
| WO | 2012/088429 A2 | 6/2012 |
| WO | 2013/106113 A2 | 7/2013 |
| WO | 2013/131015 A1 | 9/2013 |
| WO | 2013/106113 A3 | 10/2013 |
| WO | 2013/163571 A2 | 10/2013 |
| WO | 2013/163571 A3 | 3/2014 |

OTHER PUBLICATIONS

Extended European Search Report for European Patent Application No. 11850707.8, mailed on Jul. 3, 2014, 8 pages.

Office Action received for Brazilian Patent Application No. 0722418-4, mailed on Jan. 14, 2013, 3 pages.

Extended European Search Report received for European Patent Application No. 07776479.3, mailed on May 26, 2010, 6 pages.

Office Action received for European Patent Application No. 07776479.3, mailed on May 30, 2012, 6 pages.

Office Communication [Rules 161(2) and 162 EPC] received for European Patent Application No. 10778488.6, mailed on Dec. 30, 2011, 2 pages.

(56) References Cited

OTHER PUBLICATIONS

Office Action received for European Patent Application No. 10814256.3, mailed on Sep. 6, 2013, 4 pages.
Restriction Requirement Received for U.S. Appl. No. 11/897,119, mailed on Sep. 30, 2011, 6 pages.
Non Final Office Action received for U.S. Appl. No. 11/901,336, mailed on Apr. 27, 2010, 10 pages.
Notice of Allowance received for U.S. Appl. No. 11/901,336, mailed on Aug. 24, 2010, 5 pages.
Extended European Search Report received for European Patent Application No. 11162906.9, mailed on Dec. 13, 2011, 14 pages.
Office Communication [Rules 161(2) and 162 EPC] received for European Patent Application No. 11162906.9, mailed on Jan. 16, 2012, 2 pages.
Office Action received for European Patent Application No. 11162906.9, mailed on Mar. 6, 2013, 5 pages.
Partial European Search Report received for EP Patent Application No. 11162906.9, mailed on Aug. 23, 2011, 9 pages.
Office Communication [Rules 161(2) and 162 EPC] received for European Patent Application No. 11772569.7, mailed on Nov. 30, 2012, 2 pages.
Non Final Office Action received for U.S. Appl. No. 12/214,687, mailed on Jun. 2, 2011, 5 pages.
Restriction Requirement received for U.S. Appl. No. 12/226,650, mailed on Jun. 30, 2011, 4 pages.
Non Final Office Action received for U.S. Appl. No. 12/286,913, mailed on Sep. 28, 2011, 7 pages.
Restriction Requirement received for U.S. Appl. No. 12/763,102, mailed on Sep. 17, 2012, 11 pages.
Non-Final Office Action received for U.S. Appl. No. 12/976,344, mailed on Apr. 1, 2014, 19 pages.
Restriction Requirement received for U.S. Appl. No. 13/202,011, mailed on Jul. 17, 2012, 6 pages.
Advisory Action received for U.S. Appl. No. 13/591,092, mailed on Jun. 6, 2013, 3 pages.
Final Office Action received for U.S. Appl. No. 13/591,092, mailed on Mar. 25, 2013, 22 pages.
Notice of Allowance received for U.S. Appl. No. 13/591,092, mailed on Feb. 21, 2014, 11 pages.
Office Action received for Canadian Patent Application No. 2,650,860, mailed on May 12, 2011, 2 pages.
Office Action received for Canadian Patent Application No. 2,737,704, mailed on Jun. 4, 2012, 4 pages.
Notice of Allowance received for Canadian Patent Application No. 2,762,985, mailed on Oct. 29, 2012, 1 page.
Office Action received for Canadian Patent Application No. 2,762,985, mailed on Jul. 6, 2012, 2 pages.
Office Action received for Australian Patent Application No. 2007248736, mailed on Dec. 1, 2009, 2 pages.
Office Action received for Chinese Patent Application No. 201110097994.X, mailed on Jul. 30, 2012, 14 pages of English Translation & 11 pages of Official Copy.
Office Action received for Chinese Patent Application No. 201110097994.X, mailed on Mar. 27, 2013, 7 pages English Translation.
Office Action received for Chinese Patent Application No. 201210287568.7, mailed on Jul. 26, 2013, 3 pages English Translation.
Notice of Allowance received for Canadian Patent Application No. 2,650,860, mailed on Apr. 2, 2013, 1 page.
Non Final Office Action received for Canadian Patent Application No. 2,760,840, mailed on Jul. 30, 2013, 4 pages.
Office Action received for Indian Patent Application No. 5933/CHENP/2008, mailed on Oct. 29, 2010, 2 pages.
Allan et al., "Replacement of Fish Meal in Diets for Australian Silver Perch, *Bidyanus bidyanus*: I. Digestibility of Alternative Ingredients", Aquaculture, vol. 186, No. 3-4, Jun. 2000, pp. 293-310.
Balan et al., "Lignocellulosic Biomass Pretreatment Using AFEX", Biofuels: Methods and Protocols. Methods in Molecular Biology, Chapter 5, vol. 581, 2009, pp. 61-77.

Balan et al., "Mushroom Spent Straw: A Potential Substrate for an Ethanol-Based Biorefinery", Journal of Industrial Microbiology and Biotechnology, vol. 35, No. 5, Society for Industrial Microbiology, 2008, pp. 293-301.
Baldrian, et al., "Variability of Laccase Activity in the White-Rot Basidiomycete *Pleurotus ostreatus*", Folia Microbiologica, vol. 47, No. 4. 2002, pp. 385-390.
Bals et al., "Enzymatic Hydrolysis of Distiller's Dry Grain and Solubles (DDGS) Using Ammonia Fiber Expansion Pretreatment", Energy & Fuels 2006, vol. 20, No. 6, American Chemical Society, Oct. 2006, pp. 2732-2736.
Beale et al., "Leaf Photosynthesis in the C4-Grass *Miscanthus* x *giganteus*, Growing in the Cool Temperate Climate of Southern England", Journal of Experimental Botany, vol. 47, No. 295, Feb. 1996, pp. 267-273.
Belyea et al., "Element Concentrations of Dry-Grind Corn-Processing Streams", Applied Biochemistry and Biotechnology, vol. 134, No. 2, Humana Press, 2006, pp. 113-128.
Betschart et al., "Extractability and Solubility of Leaf Protein", J. Agric. Food Chem., vol. 21, No. 1, 1973, pp. 60-65.
Boluk, Yaman, "Acid-Base Interactions and Swelling of Cellulose Fibers in Organic Liquids", Cellulose, vol. 12, No. 6, Springer Netherlands, Dec. 2005, pp. 577-593.
Bothast et al., "Biotechnological Processes for Conversion of Corn into Ethanol", Appl Microbiol Biotechnol, vol. 67, No. 1, Springer-Verlag, Apr. 2005, pp. 19-25.
Cen et al., "Production of Cellulose by Solid-State Fermentation", Advances in Biochemical Engineering/Biotechnology, vol. 65, Springer-Verlag Berlin Heidelberg, 1999, pp. 69-92.
Chahal et al., "Production of Cellulose in Solid-State Fermentation with *Trichoderma reesei* MCG 80 on Wheat Straw", Applied Biochemistry and Biotechnology, vols. 57/58, No. 1, Humana Press Inc., 1996, pp. 433-442.
Christian et al., "Degradation of Xenobiotic Compounds by Lignin-Degrading White-Rot Fungi: Enzymology and Mechanisms Involved", Indian Journal of Experimental Biology, vol. 43, Apr. 2005, pp. 301-312.
Chundawat, Shishir P., "Ultrastructural and Physicochemical Modifications within Ammonia Treated Lignocellulosic Cell Walls and their Influence on Enzymatic Digestibility", Dissertation for Michigan State University, ProQuest. UMI Dissertation Publishing, vol. 1, 2009, 230 pages.
Clifton-Brown et al., "Performance of 15 *Miscanthus* Genotypes at Five Sites in Europe", Agronomy Journal, vol. 93, No. 5, 2001, pp. 1013-1019.
Cohen et al., "Biotechnological Applications and Potential of Wood-Degrading Mushrooms of the Genus *Pleurotus*", Appl Microbial Biotechnol, vol. 58, Feb. 2002, pp. 582-591.
Non-Final Office Action received for U.S. Appl. No. 13/591,092, mailed on Dec. 13, 2012, 13 pages.
Office Action received for European Patent Application No. 07776479.3, mailed on Dec. 5, 2012, 4 pages.
Non Final Office Action received for U.S. Appl. No. 11/729,632, mailed on May 6, 2009, 5 pages.
Notice of Allowance received for U.S. Appl. No. 11/729,632, mailed on Nov. 16, 2009, 5 pages.
Notice of Allowance received for U.S. Appl. No. 12/226,763, mailed on Jan. 22, 2013, 7 pages.
Final Office Action received for U.S. Appl. No. 12/226,763, mailed on Jan. 10, 2012, 16 pages.
Non Final Office Action received for U.S. Appl. No. 12/226,763, mailed on Aug. 22, 2011, 13 pages.
Notice of Allowance received for U.S. Appl. No. 12/226,763, mailed on May 29, 2012, 9 pages.
Notice of Allowance received for U.S. Appl. No. 12/226,763, mailed on Oct. 1, 2012, 7 pages.
Final Office Action received for U.S. Appl. No. 12/229,225, mailed on Jan. 6, 2012, 7 pages.
Non Final Office Action received for U.S. Appl. No. 12/229,225, mailed on Aug. 16, 2011, 6 pages.
Non Final Office Action received for U.S. Appl. No. 12/286,913, mailed on Mar. 1, 2012, 7 pages.

(56) References Cited

OTHER PUBLICATIONS

Notice of Allowance received for U.S. Appl. No. 12/286,913, mailed on Oct. 3, 2012, 5 pages.
Non Final Office Action received for U.S. Appl. No. 12/763,102, mailed on Dec. 24, 2012, 18 pages.
Final Office Action received for U.S. Appl. No. 12/763,102, mailed on Aug. 5, 2013, 12 pages.
Advisory Action received for U.S. Appl. No. 12/763,102, mailed on Dec. 6, 2013, 3 pages.
Non Final Office Action received for U.S. Appl. No. 12/976,344 mailed on Apr. 5, 2013, 12 pages.
Notice of Allowance received for U.S. Appl. No. 12/976,344, mailed on Feb. 23, 2012, 7 pages.
Notice of Allowance received for U.S. Appl. No. 12/976,344, mailed on Mar. 27, 2012, 8 pages.
Notice of Allowance received for U.S. Appl. No. 13/202,011 mailed on Apr. 9, 2013, 9 pages.
Notice of Allowance received for U.S. Appl. No. 13/202,011, mailed on Nov. 8, 2013, 7 pages.
Non Final Office Action received for U.S. Appl. No. 13/202,011 mailed on Sep. 27, 2012, 8 pages.
Notice of Allowance received for Canadian Patent Application No. 2,650,860 mailed on Apr. 2, 2013.
Office Action received for Canadian Patent Application No. 2,650,860 mailed on Jun. 18, 2012, 2 pages.
Office Action received for Canadian Patent Application No. 2,650,860, mailed on Oct. 24, 2011, 3 pages.
Office Action received for Canadian Application No. 2,737,704, mailed on Feb. 21, 2013, 3 pages.
Office Action received for Canadian Patent Application No. 2,737,704, mailed on Nov. 5, 2012, 3 pages.
Office Action received for Canadian Patent Application No. 2,760,840, mailed on Jul. 30, 2013, 4 pages.
Office Action received for Canadian Patent Application No. 2,760,840, mailed on Mar. 28, 2012, 3 pages.
Office Action received for Canadian Patent Application No. 2,760,840, mailed on Aug. 6, 2012, 4 pages.
Office Action received in Canadian Application No. 2,760,840, mailed on Jan. 3, 2013, 3 pages.
Office Action received for Canadian Patent Application No. 2,762,985 mailed on Mar. 13, 2012, 4 pages.
Office Action received for Chinese Patent Application No. 200780025394.4, issued on Oct. 13, 2011, 7 pages of English Translation & 4 pages of Official Copy.
Office Action received for Chinese Patent Application No. 200780025394.4, issued on Oct. 30, 2012, 3 pages of Official Copy only.
Patent Examination Report received for Australian Patent Application No. 2010249409, issued on Aug. 30, 2012, 5 pages.
Patent Examination Report received for Australian Patent Application No. 2010289797, issued on Oct. 30, 2012, 4 pages.
Patent Examination Report received for Australian Patent Application No. 2011201768, issued on Jun. 21, 2012, 3 pages.
Patent Examination Report received for Australian Patent Application No. 2013205681 issued Jun. 27, 2013, 4 pages.
European Search Report and Opinion received for European Patent Application No. 10814256, mailed on Jan. 23, 2013, 6 pages.
International Search Report and Written Opinion received for PCT Patent Application No. PCT/US2007/010415, mailed on Oct. 11, 2007, 5 pages.
International Search Report and Written Opinion received for Patent Application No. PCT/US2010/046525, mailed on Apr. 29, 2011, 9 pages.
International Preliminary Report on Patentability received for Patent Application No. PCT/US2010/046525 issued on Feb. 28, 2012, 5 pages.
International Search Report and Written Opinion received for PCT Patent Application No. PCT/US2011/061617, mailed on Jun. 8, 2012, 10 pages.
International Search Report and Written Opinion received for PCT Patent Application No. PCT/US2011/066868, mailed on Sep. 19, 2012, 6 pages.
International Search Report received for PCT Patent Application No. PCT/US2013/028689 mailed on Jun. 4, 2013, 5 pages.
Adapa et al., "Compression Characteristics of Selected Ground Agricultural Biomass", Agricultural Engineering International: the CIGR Ejournal, Manuscript 1347, vol. XI, Jun. 2009, 19 pages.
Adapa et al., "Pelleting Characteristics of Selected Biomass With and Without Steam Explosion Pretreatment", Int. J. Agric. & Biol. Eng., vol. 3, No. 3, Sep. 2010, pp. 62-79.
Alizadeh et al., "Pretreatment of Switchgrass by Ammonia Fiber Explosion (AFEX)", Applied Biochemistry and Biotechnology, vol. 121-124, 2005, pp. 1133-1141.
Bergner et al., "Archives of Animal Nutrition" Arch. Tierernahr, vol. 30, 1980, pp. 239-256.
Carolan et al., "Technical and Financial Feasibility Analysis of Distributed Bioprocessing Using Regional Biomass Pre-Processing Centers", Journal of Agricultural & Food Industrial Organization, vol. 5, No. 2, Article 10, Explorations in Biofuels Economics, Policy, and History, 2007, 29 pages.
Office Action received for Mexican Patent Application No. MX/a/2011/012357, mailed on Mar. 13, 2013, 1 page of English Transiation.
International Preliminary Report on Patentability received for PCT Patent Application No. PCT/US2007/010410, mailed on Dec. 12, 2008, 5 pages.
International Search Report and Written Opinion received for PCT Patent Application No. PCT/US2007/010410, mailed on Jun. 14, 2008, 5 pages.
International Preliminary Report on Patentability received for PCT Patent Application No. PCT/US2007/010415, mailed on Aug. 5, 2008, 6 pages.
International Search Report and Written Opinion received for PCT Patent Application No. PCT/US2008/011488, mailed on Jan. 8, 2009, 6 pages.
International Preliminary Report on Patentability received for PCT Application No. PCT/US2011/065863, mailed on Jul. 4, 2013, 5 pages.
International Search Report and Written Opinion received for PCT Application No. PCT/US2012/059898, mailed on Jul. 26, 2013, 11 pages.
Paul et al., "Liquid-Vapor Interfacial Properties of Water-Ammonia Mixtures: Dependence on Ammonia Concentration", J. Chem. Phys., vol. 123, No. 17, 2005, 10 pages.
Poppe, J., "Use of Agricultural Waste Materials in the Cultivation of Mushrooms", Science and Cultivation of Edible Fungi, vols. 1-2, 2000, pp. 3-23.
Ragauskas et al., "The Path Forward for Biofuels and Biomaterials", Science, vol. 311, No. 5760, Jan. 27, 2006, pp. 484-489.
Rajagopalan et al., "Enhancing Profitability of Dry Mill Ethanol Plants". Applied Biochemistry and Biotechnology, vol. 120, No. 1, Humana Press, 2005, pp. 37-50.
Rausch et al., "The Future of Coproducts from Corn Processing", Applied Biochemistry and Biotechnology, vol. 128, Humana Press Inc., 2006, pp. 47-86.
Renewable Fuels Association, "From Niche to Nation: Ethanol Industry Outlook 2006", RFA Industry Outlook, 2006, 24 pages.
Rosa et al., "Integrated Production of Ethanol Fuel and Protein from Coastal Bermudagrass", Applied Biochemistry and Biotechnology, vols. 45/46, No. 1. Humana Press Inc., 1994, pp. 483-497.
Saha, Badal C., "Hemicellulose Bioconversion", Journal of Industrial Microbiology and Biotechnology, vol. 30, No. 5, May 2003, pp. 279-291.
Sanchez et al., "Biodegradation of Viticulture Wastes by *Pleurotus*: A Source of Microbial and Human Food and Its Potential Use in Animal Feeding", J. Agric. Food Chem., vol. 50, No. 9, American Chemical Society, Apr. 24, 2002, pp. 2537-2542.
Sanderson et al., "Switchgrass as a Sustainable Bioenergy Crop", Bioresource Technology. Elsevier Science Limited, vol. 56, No. 1, Apr. 1996, pp. 83-93.

(56) References Cited

OTHER PUBLICATIONS

Sarikaya et al., "Solid-State Fermentation of Lignocellulosic Plant Residues from *Brassica napus* by *Pleurotus ostreatus*", Applied Biochemistry and Biotechnology, vol. 82, No. 1, Humana Press, Oct. 1999, pp. 1-15.
Singh et al., "Composting of a Crop Residue through Treatment with Microorganisms and Subsequent Vermicomposting", Bioresource Technology, vol. 85, No. 2, Nov. 2002, pp. 107-111.
Sluiter et al., "Determination of Strutural Carohydrates and Lignin in Biomass", National Renewable Enegy Laboratory, Laboratory Analytical Procedure (LAP), Technical Report, NREL/TP-510-42618, Apr. 25, 2008, 17 pages.
Steele et al., "Enzyme Recovery and Recycling Following Hydrolysis of Ammonia Fiber Explosion-Treated Corn Stover", Applied Biochemistry and Biotechnology, vols. 121-124, Nos. 1-3, Humana Press, 2005, pp. 901-910.
Sukumaran et al., "Cellulase Production Using Biomass Feed Stock and its Application in Lignocellulose Saccharification for Bio-Ethanol Production", Renewable Energy. Elsevier Ltd., vol. 34, No. 2, Feb. 2009, pp. 421-424.
Sulbaran-De-Ferrer et al., "Enzymatic Hydrolysis of Ammonia-Treated Rice Straw", Applied Biochemistry and Biotechnology, vols. 105-108, 2003, pp. 155-164.
SunOpta Bioprocess Group, "SuriOpta BioProcess Solutions", Sun Opta, 2838 Bovaird Drive West, Norval, Ontario L7A OH2, bioprocess@sunopta.com, 2007, 20 pages.
Suto et al., "Induction and Catabolite Repression Mechanisms of Cellulase in Fungi", Journal of Bioscience and Bioengineering, vol. 92, No. 4, Elsevier B.V., 2001, pp. 305-311.
Taniguchi et al., "Evaluation of Pretreatment with *Pleurotus ostreatus* for Enzymatic Hydrolysis of Rice Straw", Journal of Bioscience and Bioengineering, vol. 100, No. 6, Elsevier B.V., Dec. 2005, pp. 637-643.
Tanner Industries, Inc., "Anhydrous Ammonia", Customer Manual, Dec. 2006, 17 pages.
Tolan, Jeffrey S., "Iogen's Demonstration Process for Producing Ethanol from Cellulosic Biomass", Chapter 9, Fuel-oriented Biorefineries, Biorefineries—Industrial Processes and Products, Wiley-VCH Verlag GmbH & Co., 2006, pp. 193-248.
Turner et al., "Disruption of Forage Structure with an Ammonia Fiber Explosion Process", Proceedings, Western Section, American Society of Animal Science, vol. 41, 1990, pp. 494-497.
Uraki et al., "Body Temperature-Responsive Gels Derived from Hydroxypropylcellulose Bearing Lignin II: Adsorption and Release Behavior", Cellulose, vol. 13, No. 3, Springer Netherlands, Jun. 2006, pp. 225-234.
Urribarri et al., "Leaf Protein from Ammonia-Treated Dwarf Elephant Grass (*Pennisetum purpureum* Schum cv. Mott)", Applied Biochemistry and Biotechnology, Humana Press Inc, vols. 121-124., 2005, pp. 721-730.
Vrije et al., "Pretreatment of *Miscanthus* for Hydrogen Production by *Thermotoga elfii*", International Journal of Hydrogen Energy, vol. 27, Nos. 11-12, 2002, pp. 1381-1390.
Waiss et al., "Improving Digestibility of Straws for Ruminant Feed by Aqueous Ammonia", Journal of Animal Science, vol. 35, No. 1, 1972, pp. 109-112.
Warzywoda et al., "Production and Characterization of Cellulolytic Enzymes from *Trichoderma reesei* Grown on Various Carbon Sources", Bioresource Technology, vol. 39, 1992, pp. 125-130.
Wheals et al., "Fuel Ethanol after 25 Years", Trends in Biotechnology, Department of Biology and Biochemistry, vol. 17, No. 12, Dec. 1999, pp. 482-487.
Williams et al.. "An Initial Assessment of Spent Mushroom Compost as a Potential Energy Feedstock", Bioresource Technology, vol. 79, No. 3, Sep. 2001, pp. 227-230.
Ye et al., "Improving Accessibility and Reactivity of Cellulose of Annual Plants for the Synthesis of Methylcellulose", Cellulose, vol. 12, No. 5, Oct. 2005, pp. 507-515.
Zhang et al., "A Transition from Cellulose Swelling to Cellulose Dissolution by A-Phosphoric Acid: Evidence from Enzymatic Hydrolysis and Supramolecular Structure", Biomacromolecules, vol. 7, No. 2, ACS Publication, Feb. 2006, pp. 644-648.
Zhang et al., "Oyster Mushroom Cultivation with Rice and Wheat Straw", Bioresource Technology, vol. 82, No. 3, May 2002, pp. 277-284.
Zhang et al., "Toward an Aggregated Understanding of Enzymatic Hydrolysis of Cellulose: Noncomplexed Cellulase Systems", Biotechnology and Bioengineering, vol. 88, No. 7, Dec. 30, 2004, pp. 797-824.
Zhong et al., "Optimization of Enzymatic Hydrolysis and Ethanol Fermentation from AFEX-Treated Rice Straw", Applied Microbiology and Biotechnology, vol. 84, No. 4, Springer-Verlag, Sep. 2009, pp. 667-676.
Zhou et al., "Gene Integration and Expression and Extracellular Secretion of *Erwinia chrysanthemi* Endoglucanase CelY (celY) and CelZ (celZ) in Ethanologenic *Klebsiella oxytoca* P2†", Applied and Environmental Microbiology, vol. 67, No. 1, American Society for Microbiology, 2001, pp, 6-14.
Dale et al., "Fermentation of Lignoceitulosic Materials Treated by Ammonia Freeze-Explosion", The Society for Industrial Microbiology, 1985, Reprinted from vol. 26 of Developments in Industrial Microbiology, pp. 223-233.
Eggeman, T., "Ammonia Fiber Explosion Pretreatment for Bioethanol Production", Submitted to National Renewable Energy Laboratory (NREL) under subcontract No. LC0-1-31055-01, 2001, 17 pages.
El-Adawy et al., "Nutritional Potential and Functional Properties of Sweet and Bitter Lupin Seed Protein Isolates", Food Chemistry, vol. 74, No. 4, Elsevier Science Ltd., 2001, pp. 455-462.
Energy Policy Act of 2005 Public Law, Public Law 109-58, 109th Congress, lst Session, Aug. 8, 2005, 11 pages.
U.S. Fuel Ethanol Industry Biorefineries and Production Capacity, available online at <http://www.ethanolrfa.org/industry/locations>, Nov. 18, 2008, 4 pages.
Felix et al., "In Vitro and in Vivo Digestibility of Soya-Bean Straw Treated with Various Alkalis", Animal Production, vol. 51, No. 1, British Society of Animal Production, 1990, pp. 47-59.
Fernandez et al., "Protein Extraction from *Atriplex lampa* Leaves: Potential Use as Forage for Animals used for Human Diets", Plant Foods for Human Nutrition, Kluwer Academic Publishers, vol. 54, No. 3, 1999, pp. 251-259.
Ferrer et al., "Increasing Nutrient Availability of Feather Meal for Ruminants and Non-Ruminants Using an Ammonia Pressurisation/ Depressurisation Process", Journal of the Science of Food and Agriculture, vol. 79 Society of Chemical Industry, 1999, pp. 828-832.
Ferrer et al., "Optimizing Ammonia Pressurization/Depressurization Processing Conditions to Enhance Enzymatic Susceptibility of Dwarf Elephant Grass", Applied Biochemistry and Biotechnology, Humana Press Inc., vol. 84-86, No. 1-9, Mar. 2000, pp. 163-179.
Fiorentini et al., "Pilot Plant Production of an Edible Alfalfa Protein Concentrate", Journal of Food Science, vol. 46, No. 5, Sep. 1981, pp. 1514-1517.
Foster et al., "Enzymatic Hydrolysis of Ammonia-Treated Sugar Beet Pulp", Applied Biochemistry and Biotechnology, Humana Press Inc., vol. 91-93, 2001, pp. 269-282.
Fulks et al., "A Review of Solid Materials as Alternative Ammonia Sources for Lean NOx Reduction with SCR", Technical Paper No. 9-2009-01-0907. SAE International, 2009, 13 pages.
Gao et al., "Mixture Optimization of Six Core Glycosyl Hydrolases for Maximizing Saccharification of Ammonia Fiber Expansion (AFEX) Pretreated Corn Stover", Bioresource Technology, vol. 101, Issue 3, Apr. 2010, pp. 2770-2781.
Gollapalli et al., "Predicting Digestibility of Ammonia Fiber Explosion (AFEX)-Treated Rice Straw", Applied Biochemistry and Biotechnology, Humana Press Inc., vol. 98-100, 2002, pp. 23-35.
Gray et al., "Bioethanol", Current Opinion in Chemical Biology, Elsevier, vol. 10, 2006, pp. 141-146.
Greene et al., "Growing Energy: How Biofuels Can Help End America's Oil Dependence", Natural Resources Defense Council, Dec. 2004, 86 pages.
Houghton et al., "Fungal Upgrading of Wheat Straw for Straw-Thermoplastics Production", Applied Biochemistry and Biotechnology, vol. 113-116, Humana Press Inc., 2004, pp. 71-93.

(56) References Cited

OTHER PUBLICATIONS

Hahn-Hagerdal et al., "Bio-Ethanol—The Fuel of Tomorrow from the Residues of Today", Trends in Biotechnology vol. 24, No. 12, Elsevier Ltd., Dec. 2006, pp. 549-556.

Hanchar et al., "Separation of Glucose and Pentose Sugars by Selective Enzyme Hydrolysis of AFEX-Treated Corn Fiber", Applied Biochemistry and Biotechnology, vols. 137-140, Nos. 1-12, Humana Press Inc., 2007, pp. 313-326.

Heaton et al., "A Quantitative Review Comparing the Yields of Two Candidate $C_4$ Perennial Biomass Crops in Relation to Nitrogen, Temperature and Water", Biomass and Bioenergy, vol. 27, No. 1, Jul. 2004, pp. 21-30.

Heaton et al., "*Miscanthus* for Renewable Energy Generation: European Union Experience and Projections for Illinois", Mitigation and Adaptation Strategies for Global Change, vol. 9, No. 4, Oct. 2004, pp. 433-451.

Holtzapple et al., "The Ammonia Freeze Explosion (AFEX) Process: A Practical Lignocellulose Pretreatment", Applied Biochemistry and Biotechnology, vols. 28/29, No. 1, 1991, pp. 59-74.

Israilides et al., "Bio-technologies of Recycling Agro-industrial Wastes for the Production of Commercially Important Fungal Polysaccharides and Mushrooms", Biotechnology and Genetic Engineering Reviews, vol. 20, Dec. 2003, pp. 247-259.

Jain et al., "Effect of Ammonia Pretreatment on Switchgrass for Production of Cellulose using *Trichoderma reesei* Rut C-30", 31st Symposium on Biotechnology for Fuels and Chemicals. May 4, 2009, 1 page.

Jeoh et al., "Cooperative and Competitive Binding in Synergistic Mixtures of *Thermobifida fusca* Celluloses Ce15A, Ce16B, and Ce19A", Biotechnol. Prog., vol. 18, No. 4, 2002, pp. 760-769.

Jin et al., "A Novel Integrated Biological Process for Cellulosic Ethanol Production Featuring High Ethanol Productivity, Enzyme Recycling and Yeast Cells Reuse", Energy & Environmental Science, The Royal Society of Chemistry, No. 5, 2012, 8 pages.

Kamm et al., "Principles of Biorefineries", Applied Microbiology and Biotechnology, vol. 64, No. 2, Springer-Verlag, Apr. 2004, pp. 137-145.

Karunanandaa et al., "Botanical Fractions of Rice Straw Colonized by White-Rot Fungi: Changes in Chemical Composition and Structure", Animal Feed Science Technology, vol. 55, 1995, pp. 179-199.

Keller et al., "Microbial Pretreatment of Biomass: Potential for Reducing Severity of Thermochemical Biomass Pretreatment", Applied Biochemistry and Biotechnology, vols. 105-108, Humana Press Inc., 2003, pp. 27-41.

Kim et al., "Enhancement of the Enzymatic Digestibility of Waste Newspaper Using Tween", Applied Biochemistry and Biotechnology, vols. 129-132, Humana Press Inc., 2006, pp. 486-495.

Knauf et al., "Lignocellulosic Biomass Processing: A Perspective", International Sugar Journal, vol. 106, No. 1263, 2004, pp. 147-150.

Kudra et al., "Advanced Drying Technologies: Superheated Steam Drying", Marcel Dekker, Inc., 2002, pp. 81-111.

Ladisch et al., "Building a Bridge to the Ethanol Industry—Follow-Up Project", National Renewable Energy Laboratory, Apr. 2003, 36 pages.

Laureano-Perez et al., "Understanding Factors that Limit Enzymatic Hydrolysis of Biomass", Characterization of Pretreated Corn Stover, Applied Biochemistry and Biotechnology, vols. 121-124, Humana Press Inc., 2005, pp. 1081-1099.

Lin et al., "Ethanol Fermentation from Biomass Resources: Current State and Prospects", Applied Microbiology and Biotechnology, Springer-Verlag, vol. 69, No. 6., Feb. 2006, pp. 627-642.

Lloyd et al., "Combined Sugar Yields for Dilute Sulfuric Acid Pretreatment of Corn Stover Followed by Enzymatic Hydrolysis of the Remaining Solids", Bioresource Technology, vol. 96, No. 18, Dec. 2005, pp. 1967-1977.

Lovrien et al., "Assays for Total Protein", Current Protocols in Protein Science, John Wiley & Sons, Inc., 1995, 24 pages.

Lu et al., "Cellulase Adsorption and an Evaluation of Enzyme Recycle During Hydrolysis of Steam-Exploded Softwood Residues", Applied Biochemistry and Biotechnology, vols. 98-100, Humana Press Inc., 2002, pp. 641-654.

Lynd et al., "Microbial Cellulose Utilization: Fundamentals and Biotechnology", Microbiology and Molecular Biology Reviews, vol. 66, No. 3, Sep. 2002, pp. 506-577.

Madakadze et al., "Cutting Frequency and Nitrogen Fertilization Effects on Yield and Nitrogen Concentration of Switchgrass in a Short Season Area", Crop Science, vol. 39, No. 2, Mar.-Apr. 1999, pp. 552-557.

Mani et al., "Economics of Producing Fuel Pellets from Biomass", Applied Engineering in Agriculture, vol. 22, No. 3, American Society of Agricultural and Biological Engineers, pp. 421-426.

Mantanis et al., "Swelling of Compressed Cellulose Fiber Webs in Organic Liquids", Cellulose, vol. 2, No. 1, Kluwer Academic Publishers, 1995, pp. 1-22.

Martinez et al., "Biodegradation of Lignocellulosic: Microbial, Chemical, and Enzymatic Aspects of the Fungal Attack of Lignin", International Microbiology, vol. 8, 2005, pp. 195-204.

Obodai et al., "Comparative Study on the Growth and Yield of *Pleurotus ostreatus* Mushroom on Different Lignocellulosic By-Products", Journal of Industrial Microbiology and Biotechnology, vol. 30, No. 3, Society for Industrial Microbiology, 2003, pp. 146-149.

O'Connor, James J., "Ammonia Explosion Pulping : A New Fiber Separation Process", Tappi, vol. 55, No. 3, Mar. 1972, pp. 353-358.

Ohara, H., "Biorefinery", Applied Microbiology and Biotechnology, Springer-Verlag, vol. 62, No. 5-6, Oct. 2003, pp. 474-477.

Ordonez et al., "Obtaining a Protein Concentrate from Integral Defatted Sunflower Flour", Bioresource Technology, vol. 78, No. 2, Elsevier Science Ltd., 2001, pp. 187-190.

Ozturk et al., "Splitting Tendency of Cellulosic Fibers. Part 2: Effects of Fiber Swelling in Alkali Solutions", Cellulose, vol. 13, No. 4, Springer Netherlands, Aug. 2006, pp. 403-409.

Pandey et al., "Economic Utilization of Crop Residues for Value Addition: A Futuristic Approach", Journal of Scientific & Industrial Research, vol. 59, Jan. 2000, pp. 12-22.

Park et al., "Investigation and Optimization of the Factors Influencing Sorghum Protein Extraction", Journal of Agricultural and Food Chemistry, vol. 51, No. 24, American Chemical Society, Oct. 2003, pp. 7050-7054.

Non-Final Office Action received for U.S. Appl. No. 11/719,158, mailed on Apr. 1, 2009, 6 pages.

Final Office Action received for U.S. Appl. No. 11/719,158, mailed on Aug. 4, 2010, 7 pages.

Notice of Allowance received for U.S. Appl. No. 11/719,158, mailed on Jan. 6, 2011, 4 pages.

Non-Final Office Action received for U.S. Appl. No. 12/791,703, mailed on Jul. 27, 2012, 7 pages.

Notice of Allowance received for U.S. Appl. No. 12/791,703, mailed on Nov. 8, 2012, 8 pages.

International Search Report and Written Opinion for PCT Patent Application No. PCT/US2011/038524, mailed on Feb. 9, 2012, 7 pages.

International Search Report received for PCT Patent Application No. PCT/US2013/037935, mailed on Jul. 19, 2013, 4 pages.

Viable Herbal Solutions, "Production Techniques to Produce Herbal Extracts", available Online at <http://viablehealth.com/herb/herbs42.html>, Prior to Mar. 15, 2013, 4 pages.

Bals et al., "Evaluating the Impact of Ammonia Fiber Expansion (AFEX) Pretreatment Conditions on the Cost of Ethanol Production", Bioresource Technology, vol. 102, 2011, pp. 1277-1283.

Kawasaki et al., "Deodorization of Ammonia by Coffee Grounds", Journal of Oleo Science, vol. 55, No. 1, 2006, pp. 31-35.

Selig et al., "Enzymatic Saccharification of Lignocellulosic Biomass", National Renewable Energy Laboratory, Technical Report, NREL/TP-510-42629, Mar. 21, 2008, 8 pages.

Sendich et al., "Recent Process Improvements for the Ammonia Fiber Expansion (AFEX) Process and Resulting Reductions in Minimum Ethanol Selling Price", Bioresource Technology, vol. 99, 2008, pp. 8429-8435.

(56) References Cited

OTHER PUBLICATIONS

Teymouri et al., "Hydrolysis of Ground and Unground AFEX Treated Corn Stover with Different Combinations of Cellulase and Xylanase", 27th Symposium on Biotechnology for Fuels and Chemicals, May 1-4, 2005, 21 pages.
Notice of Allowance received for U.S. Appl. No. 13/458,830, mailed on Jul. 9, 2014, 8 pages.
Examination Report received for Australian Patent Application No. 2011348161, mailed on Feb. 21, 2014, 4 pages.
Chundawat et al., "Effect of Particle Size Based Separation of Milled Corn Stover on AFEX Pretreatment and Enzymatic Digestibility", Biotechnology and Bioengineering, vol. 96, No. 2, Feb. 1, 2007, pp. 219-231.
Cosgrove, Daniel J., "Growth of the Plant Cell Wall", Nature Reviews Molecular Cell Biology, vol. 6, Nov. 2005, pp. 850-861.
Erickson, David R., "Edible Fats and Oils Processing: Basic Principles and Modern Practices", AOCS Press, 1990, 6 pages.
Kim et al., "Pretreatment of Corn Stover by Low-Liquid Ammonia Recycle Percolation Process", Applied Biochemistry and Biotechnolology, vol. 133, Apr. 2006, pp. 41-57.
Piva et al., "Detoxification Methods of Aflatoxins. A Review", Nutrition Research, vol. 15, No. 5, May 1995, pp. 767-776.
Prevot-D'Alvise et al., "Development of a Pilot Process for the Production of Alfalfa Peptide Isolate", Journal of Chemical Technology and Biotechnology, vol. 78, Issue 5, May 2003, pp. 518-528.
Somerville et al., "Toward a Systems Approach to Understanding Plant Cell Walls", Science, vol. 306, No. 5705, Dec. 24, 2004, 12 pages.
Walter, Arnaldo, "Industrial Uses of Biomass Energy . . . New Technologies for Modern Biomass Energy Carriers", Taylor & Francis, Chapter 9, edited by Rosillo-Calle F., Bajay SV, Rothman H, 2000, 57 pages.
Chahal, "Bioconversion of Hemicelluloses into Useful Products in an Integrated Process for Food/Feed and Fuel (Ethanol) Production from Biomass", Biotechnology and Bioengineering Symposium, No. 14, 1984, pp. 425-433.
Chang, "The World Mushroom Industry: Trends and Technological Development", International Journal of Medicinal Mushrooms, vol. 8, 2006, pp. 297-314.
Chundawat et al., "Multi-scale Visualization and Characterization of Lignocellulosic Plant Cell Wall Deconstruction During Thermochemical Pretreatment", Energy & Environmental Science, vol. 4, 2011, pp. 973-984.
Dale et al., "Extrusion Processing for Ammonia Fiber Explosion (AFEX)", Applied Biochemistry and Biotechnology, vols. 77-79, 1999, pp. 35-45.
Deshusses, "Biological Waste Air Treatment in Biofilters", Current Opinion in Biotechnology, vol. 8, No. 3, Environmental Biotechnology, Current Biology Ltd., 1997, pp. 335-339.
Eggeman et al., "Process and Economic Analysis of Pretreatment Technologies", Bioresource Technology, vol. 96, 2005, pp. 2019-2025.
Ferrer et al., "NR 06. Sugar Production from Rice Straw", Arch. Latinoam. Prod. Anim., vol. 5, No. 1, 1997, pp. 112-114.
Jin et al., "Two-Step SSCF to Convert AFEX-Treated Switchgrass to Ethanol using Commercial Enzymes and *Saccharomyces cerevisiae* 424A (LNH-ST)", Bioresource Technology, vol. 101, No. 21, 2010, pp. 8171-8178.
Kaliyan et al., "Roll Press Briquetting and Pelleting of Corn Stover and Switchgrass", Transactions of the Asabe, vol. 52, No. 2, 2009, pp. 543-555.
Kim et al., "Lime Pretreatment and Enzymatic Hydrolysis of Corn Stover", Bioresource Technology, vol. 96, No. 18, Dec. 2005, pp. 1994-2006.
Kim et al., "Pretreatment and Fractionation of Corn Stover by Ammonia Recycle Percolation Process", Bioresource Technology, vol. 96, No. 18, 2005, pp. 2007-2013.
Kumar et al., "Does Densification Influence the Steam Pretreatment and Enzymatic Hydrolysis of Softwoods to Sugars?", Bioresource Technology, vol. 121, Oct. 2012, pp. 190-198.
Kumar et al., "Methods for Pretreatment of Lignocellulosic Biomass for Efficient Hydrolysis and Biofuel Production", Industrial & Engineering Chemistry Research, vol. 48, No. 8, Mar. 2009, pp. 3713-3729.
Lau et al., "Cellulosic Ethanol Production from Afex-treated Corn Stover Using *Saccharomyces cerevisiae* 424A (LNH-ST)", PNAS, vol. 106, No. 5, Feb. 3, 2009, pp. 1368-1373.
Lau et al., "Comparing the Fermentation Performance of *Escherichia coli* KO11, *Saccharomyces cerevisiae* 424A (LNH-ST) and *Zymomonas mobilis* AX101 for Cellulosic Ethanol Production", Biotechnology for Biofuels, vol. 3, No. 11, 2010, 10 pages.
Lau et al., "Ethanol Fermentation of *E. coli* KO11 in Hydrolysate from AFEX-treated Corn Stover", Biomass Conversion Research Laboratory, Department of Chemical Engineering and Materials Science, Michigan State University, 1 page.
Lau et al., "The Impacts of Pretreatment on the Fermentability of Pretreated Lignocellulosic Biomass: A Comparative Evaluation between Ammonia Fiber Expansion and Dilute Acid Pretreatment", Biotechnology for Biofuels, vol. 2, No. 30, Dec. 2009, pp. 1-11.
Laureano-Perez et al., "Understanding Factors that Limit Enzymatic Hydrolysis of Biomass—Characterization of Pretreated Corn Stover", Applied Biochemistry and Biotechnology, vol. 121-124, 2005, pp. 1081-1099.
Liu et al., "Partial Flow of Compressed-Hot Water through Corn Stover to Enhance Hemicellulose Sugar Recovery and Enzymatic Digestibility of Cellulose", Bioresource Technology, vol. 96, No. 18, 2005, pp. 1978-1985.
Marshall et al., "Complete Rations for Dairy Cattle. II. Sugarcane Bagasse Pellets as Roughage in Blended Rations for Lactating Cows", Journal of Dairy Science, vol. 58, No. 6, Jun. 1975, pp. 896-900.
Miller, "Phase I Biomass Enhanced Refined Lignite Demonstration Project Commitment Letter for Project titled "Phase I Biomass Enhanced Refined Lignite Demonstration Project"", Dec. 15, 2008, 24 pages.
Mosier et al., "Features of Promising Technologies for Pretreatment of Lignocellulosic Biomass", Bioresource Technology, vol. 96, 2005, pp. 673-686.
Mosier et al., "Optimization of pH Controlled Liquid Hot Water Pretreatment of Corn Stover", Bioresource Technology, vol. 96, 2005, pp. 1986-1993.
Nwodo et al., "Xylanase Production of *Aspergillus niger* and *Penicillium chrysogenum* from Ammonia Pretreated Cellulosic Waste", Research Journal of Microbiology, vol. 3, No. 4, 2008, pp. 246-253.
Perry et al., "Reactor Design", Chemical Engineers' Handbook, Fourth Edition, 1963, 6 pages.
Rijal et al., "Combined Effect of Pelleting and Pretreatment on Enzymatic Hydrolysis of Switchgrass" Bioresource Technology, vol. 116, 2012, pp. 36-41.
Rollin et al., "Increasing Cellulose Accesibility is More Important than Removing Lignin: A Comparison of Cellulose Solvent-Based Lignocellulose Fractionation and Soaking in Aqueous Ammonia", Biotechnology and Bioengineering, vol. 108, No. 1, Jan. 2011, pp. 22-30.
Roman-Ponce et al., "Complete Rations for Dairy Cattle. V. Interaction of Sugarcane Bagasse Quantity and Form with Soybean Meal, Urea, and Starea", Journal of Dairy Science, vol. 58, No. 9, Sep. 1975, pp. 1320-1327.
Sheridan et al., "Assessment of the Influence of Media Particle Size on the Biofiltration of Odorous Exhaust Ventilation Air From a Piggery Facility", Bioresource Technology, vol. 84, 2002, pp. 129-143.
Singhania et al., "Advancement and Comparative Profiles in the Production Technologies Using Solid-State and Submerged Fermentation for Microbial Cellulases", Enzyme and Microbial Technology, vol. 46, No. 7, Jun. 2010, pp. 541-549.
Sokhansanj et al., "Biomass Densification—Cubing Operations and Costs for Corn Stover", Applied Engineering in Agriculture, vol. 20, No. 4, 2004, pp. 495-499.

(56) References Cited

OTHER PUBLICATIONS

Sun et al., "Hydrolysis of Lignocellulosic Materials for Ethanol Production: A Review", Bioresource Technology, vol. 83, No. 1, 2002, pp. 1-11.

Tabil et al., "Biomass Feedstock Pre-Processing—Part 1: Pre-Treatment", Chapter 18, Biofuel's Engineering Process Technology, Aug. 2011, pp. 411-437.

Teymouri et al., "Optimization of the Ammonia Fiber Explosion (AFEX) Treatment Parameters for Enzymatic Hydrolysis of Corn Stover", Bioresource Technology, vol. 96, 2005, pp. 2014-2018.

Theerarattananoon et al., "Effects of the Pelleting Conditions on Chemical Composition and Sugar Yield of Corn Stover, Big Bluestem, Wheat Straw, and Sorghum Stalk Pellets", Bioprocess Biosyst. Eng., vol. 35, No. 4, May 2012, pp. 615-623.

"Topic 3 R&D on Processes for Solid, Liquid and Gaseous Fuels From Biomass", 20th European Biomass Conference and Exhibition, 2012, 26 pages.

Van Horn et al., "Complete Rations for Growing Dairy Replacements Utilizing By-Product Feedstuffs", Journal of Dairy Science, vol. 63, No. 9, 1980, pp. 1465-1474.

Wang et al., "Cost Estimates and Sensitivity Analyses for the Ammonia Fiber Explosion Process", Applied Biochemistry and Biotechnology, vol. 70-72, No. 1, 1998, pp. 51-66.

Wilson, "A Cost Analysis for the Densification and Transportation of Cellulosic Biomass for Ethanol Production", Thesis for Department of Grain Science and Industry, College of Agriculture, Kansas State University, 2011, 86 pages.

Wyman et al., "Comparative Sugar Recovery Data from Laboratory Scale Application of Leading Pretreatment Technologies to Corn Stover", Bioresource Technology, vol. 96, 2005, pp. 2026-2035.

Wyman et al., "Coordinated Development of Leading Biomass Pretreatment Technologies", Bioresource Technology, vol. 96, 2005, pp. 1959-1966.

Zhang et al., "The Effect of Different Treatment Conditions on Biomass Binder Preparation for Lignite Briquette", Fuel Processing Technology, vol. 73, 2001, pp. 185-196.

Zhu et al., "Cocurrent Downflow Circulating Fluidized Bed (Downer) Reactors—A State of the Art Review", The Canadian Journal of Chemical Engineering, vol. 73, Oct. 1995, pp. 662-677.

\* cited by examiner

*8 to 16 km; **80.5 km

METHODS FOR PRODUCING AND USING DENSIFIED BIOMASS PRODUCTS CONTAINING PRETREATED BIOMASS FIBERS

This application is a Divisional of U.S. patent application Ser. No. 13/202,011 filed on Aug. 17, 2011, which application is a U.S. National Stage Filing under 35 U.S.C. 371 from International Application No. PCT/US2010/046525, filed Aug. 24, 2010, and published in English as WO 2011/028543 on Mar. 10, 2011, which application claims the benefit under 35 U.S.C. 119(e) of U.S. Provisional Application Ser. No. 61/236,403 filed on Aug. 24, 2009, which applications and publications are hereby incorporated by reference in their entirety entireties.

STATEMENT OF GOVERNMENT RIGHTS

This invention was made with government support under DE-FG36-08-G088073 and DE-FC02-07ER64494 awarded by the U.S. Department of Energy. The government has certain rights in the invention.

BACKGROUND

Primary biofuels produced today are based on corn and other grains, transesterified biodiesel from oilseed crops, such as soybeans and animal fats. Ethanol production from grains is currently the mainstay of the ethanol industry. Increasingly, however, there is a demand for cellulosic based biofuels. The inventors recognize the need for economically providing pretreated densified biomass products for use in a variety of applications.

SUMMARY

In one embodiment, a product comprising at least one densified biomass particulate having no added binder and comprised of a plurality of lignin-coated plant biomass fibers is provided, wherein the at least one densified biomass particulate has an intrinsic density substantially equivalent to a binder-containing densified biomass particulate and has a substantially smooth, non-flakey outer surface. In one embodiment, the novel product contains trace amounts of ammonia. In one embodiment, the product comprises one or more densified biomass particulates, each particulate having no added binder and an amount of lignin-coated plant biomass fiber sufficient to form a densified biomass particulate which has an intrinsic density substantially equivalent to a binder-containing densified biomass particulate.

In one embodiment, the at least one densified biomass particulate having no added binder has an increased resistance to deformation, an increased hardness, an increased resistance to degradation, an improved shelf life, or a combination thereof, as compared with a binder-containing densified biomass particulate. In one embodiment, the novel product is more able to resist stress and is likely less brittle as compared to a binder-containing densified biomass particulate.

In one embodiment, the novel product is harder, such as at least 21% harder, with at least 20% less variability in hardness than a binder-containing densified biomass particulate of the same given mass.

The novel products described herein can be any suitable shape and size, including, for example, substantially rectangular or substantially cylindrical.

In one embodiment, each of the plurality of lignin-coated plant biomass fibers is coated completely with lignin. In one embodiment, at least some of the plurality of lignin-coated biomass fibers are also coated with hemicellulose. In one embodiment, most of the plurality of lignin-coated plant biomass fibers are also coated with hemicellulose. In one embodiment, substantially all of the plurality of lignin-coated plant biomass fibers are also coated with hemicellulose, such that the hemicelluloses and lignin appear to come to the surface in a "package" rather than as separate components.

Any suitable plant biomass may be used to produce the novel products described herein, including, but not limited to, corn stover, switchgrass, pine and/or prairie cord grass.

In one embodiment, the novel product has an improved shelf life, increased resistance to degradation, increased flowability, and greater bulk density as compared to the binder-containing densified biomass particulate.

In one embodiment, a packaged product comprising a container; and a quantity of densified biomass particulates having no added binder and located within the container is provided, wherein the quantity of densified biomass particulates has a bulk density at greater than a bulk density of an identical quantity of binder-containing densified biomass particulates. The container may be a rigid container or a flexible bag.

In one embodiment, an integrated process comprising subjecting a quantity of biomass fibers to an ammonia pretreatment, wherein at least a portion of lignin contained within each fiber is moved to an outer surface of each fiber to produce a quantity of tacky biomass fibers; and densifying the quantity of tacky biomass fibers to produce one or more densified biomass particulates is provided, wherein the quantity of tacky biomass fibers is densified without adding binder. In one embodiment, the ammonia pretreatment causes at least a portion of hemicellulose contained within each fiber to move to the outer surface of each fiber. In one embodiment, the ammonia pretreatment is an ammonia fiber expansion (AFEX™) pretreatment, such as a gaseous AFEX™ pretreatment.

In one embodiment, a fuel comprising at least one densified biomass particulate of a given mass having no added binder and comprised of a plurality of lignin-coated plant biomass fibers is provided, wherein the at least one densified biomass particulate has an intrinsic density substantially equivalent to a binder-containing densified biomass particulate of the same given mass and has a substantially smooth, non-flakey outer surface. Such a fuel may be useful in biomass-burning stoves or boilers.

In one embodiment, an animal feed comprising at least one densified biomass particulate of a given mass having no added binder and comprised of a plurality of lignin-coated plant biomass fibers is provided, wherein the at least one densified biomass particulate has an intrinsic density substantially equivalent to a binder-containing densified biomass particulate of the same given mass and has a substantially smooth, non-flakey outer surface, wherein the animal feed has improved digestibility as compared with animal feed containing binder-containing densified biomass particulates.

In one embodiment, a solid material comprising at least one densified biomass particulate of a given mass having no added binder and comprised of a plurality of lignin-coated plant biomass fibers is provided, wherein the at least one densified biomass particulate has an intrinsic density substantially equivalent to a binder-containing densified biomass particulate of the same given mass and has a substantially smooth, non-flakey outer surface, wherein the solid material is useful in construction, such as in fiberboard or extruded fibrous building materials.

The resulting pellets are useful in a variety of applications, including, but not limited to, animal feed, chemical conversion, biochemical applications, electricity generating applications (e.g., for burning in a boiler, biomass-burning stove, and the like), and as a component in solid materials, such as fiberboards and extruded fibrous building materials.

DETAILED DESCRIPTION OF THE EMBODIMENTS

Figure 1:
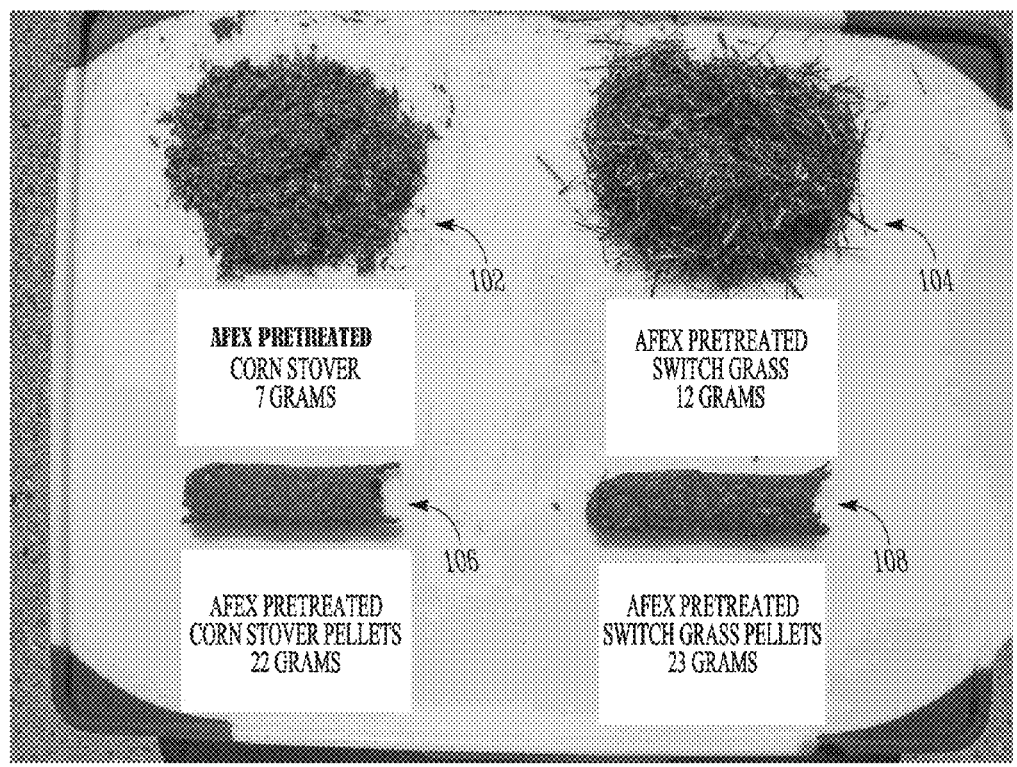
FIG. 1 comprises an image showing AFEX™ pretreated corn stover (AFEX™-CS), AFEX™ pretreated switchgrass (AFEX™-SG), AFEX™-CS pellets and AFEX™-SG pellets in embodiments of the present invention.

In the following detailed description of embodiments of the invention, embodiments are described in sufficient detail to enable those skilled in the art to practice them, and it is to be understood that other embodiments may be utilized and that chemical and procedural changes may be made without departing from the spirit and scope of the present subject matter. The following detailed description is, therefore, not to be taken in a limiting sense, and the scope of embodiments of the present invention is defined only by the appended claims.

The Detailed Description that follows begins with a definition section followed by a brief overview of cellulosic biomass, a description of the embodiments, an example section and a brief conclusion.

The term "biofuel" or "biomass" as used herein, refers in general to organic matter harvested or collected as a source of energy. Biofuels are originally derived from the photosynthesis process and can therefore be considered a solar energy source. A biofuel is a renewable solid, liquid or gaseous fuel derived from relatively "recently" dead biological material, i.e., "biomass," as distinguished from fossil fuels, which are derived from long dead biological material and are not renewable. There are generally considered to be three types of biofuels, namely, agricultural biofuels (defined below), municipal waste biofuels (residential and light commercial garbage or refuse, with most of the recyclable materials such as glass and metal removed) and forestry biofuels (e.g., trees, waste or byproduct streams from wood products, wood fiber, pulp and paper industries). Biomass can further be in the form of solid biomass, liquid biomass or gaseous biomass.

The term "agricultural biofuel", as used herein, refers to a biofuel derived from agricultural crops, crop residues, grain processing facility wastes (e.g., wheat/oat hulls, corn/bean fines, out-of-specification materials, etc.), livestock production facility waste (e.g., manure, carcasses, etc.), livestock processing facility waste (e.g., undesirable parts, cleansing streams, contaminated materials, etc.), food processing facility waste (e.g., separated waste streams such as grease, fat, stems, shells, intermediate process residue, rinse/cleansing streams, etc.), value-added agricultural facility byproducts (e.g., distiller's wet grain (DWG) and syrup from ethanol production facilities, etc.), and the like. Examples of livestock industries include, but are not limited to, beef, pork, turkey, chicken, egg and dairy facilities. Examples of agricultural crops include, but are not limited to, any type of non-woody plant (e.g., cotton), grains such as corn, wheat, soybeans, sorghum, barley, oats, rye, and the like, herbs (e.g., peanuts), short rotation herbaceous crops such as switchgrass, alfalfa, and so forth.

The term "plant biomass" or "ligno-cellulosic biomass" as used herein is intended to refer to virtually any plant-derived organic matter (woody or non-woody) available for energy on a sustainable basis. Plant biomass can include, but is not limited to, agricultural crop wastes and residues such as corn stover, wheat straw, rice straw, sugar cane bagasse and the like. Plant biomass further includes, but is not limited to, woody energy crops, wood wastes and residues such as trees, including fruit trees, such as fruit-bearing trees, (e.g., apple trees, orange trees, and the like), softwood forest thinnings, barky wastes, sawdust, paper and pulp industry waste streams, wood fiber, and the like. Additionally grass crops, such as various prairie grasses, including prairie cord grass, switchgrass, big bluestem, little bluestem, side oats grama, and the like, have potential to be produced large-scale as additional plant biomass sources. For urban areas, potential plant biomass feedstock includes yard waste (e.g., grass clippings, leaves, tree clippings, brush, etc.) and vegetable processing waste. Plant biomass is known to be the most prevalent form of carbohydrate available in nature and corn stover is currently the largest source of readily available plant biomass in the United States.

The term "pretreatment step" as used herein, refers to any step, i.e., treatment intended to alter native biomass so it can be more efficiently and economically converted to reactive intermediate chemical compounds such as sugars, organic acids, etc., which can then be further processed to a variety of value added products such as ethanol. Pretreatment methods can utilize acids of varying concentrations (including sulfuric acids, hydrochloric acids, organic acids, etc.) and/or other components such as ammonia, ammonium, lime, and the like. Pretreatment methods can additionally or alternatively utilize hydrothermal treatments including water, heat, steam or pressurized steam. Pretreatment can occur or be deployed in various types of containers, reactors, pipes, flow through cells and the like. Many pretreatment methods will cause hydrolysis of hemicellulose to pentose sugars.

The term "bulk density" as used herein, refers to the mass or dry weight of a quantity of particles or particulates (granules and other "divided" solids) divided by the total volume they occupy (mass/volume). Therefore, bulk density is not an intrinsic property of the particles, as it is changeable when the particles are subjected to movement from an external source. The volume measurement is a combination of the particle volume (which includes the internal pore volume of a particle) and the intra-particle void volume. Bulk density=intrinsic density (of each particle)×(1−voids fraction). For a given intrinsic particle density, therefore, the bulk density depends only on the void fraction, which is variable.

The term "moisture content" as used herein, refers to percent moisture of biomass. The moisture content is calculated as grams of water per gram of wet biomass (biomass dry matter plus water) times 100%.

The term "Ammonia Fiber Explosion" or "Ammonia Fiber Expansion" (hereinafter "AFEX™") pretreatment" as used herein, refers to a process for pretreating biomass with ammonia to solubilize lignin and redeposit it from in between plant cell walls to the surface of the biomass. An AFEX™ pretreatment disrupts the lignocellulosic matrix, thus modifying the structure of lignin, partially hydrolyzing hemicellulose, and increasing the accessibility of cellulose and the remaining hemicellulose to subsequent enzymatic degradation. Lignin is a primary impediment to enzymatic hydrolysis of native biomass, and removal or transformation of lignin is a suspected mechanism of several of the leading pretreatment technologies, including AFEX™. However in contrast to many other pretreatments, the lower temperatures and non-acidic conditions of the AFEX™ process reduces the conversion of lignin and sugars into lower molecular weight aromatics, furfural, hydroxymethyl furfural, and organic acids that could negatively affect microbial activity. The AFEX™ process further expands and swells cellulose fibers and further breaks up amorphous hemi-cellulose in lignocellulosic biomass. These structural changes open up the plant cell wall structure enabling more efficient and complete conversion of lignocellulosic biomass to value-added products while preserving the nutrient value and composition of the material.

The term "condensed AFEX™ pretreatment" or "gaseous AFEX™ pretreatment" as used herein, refers to a gaseous AFEX™ pretreatment as defined herein, which uses gaseous ammonia rather than liquid ammonia. By allowing hot ammonia gas to condense directly on cooler biomass, the biomass heats up quickly and the ammonia and biomass come into intimate contact. Such a pretreatment process is now more commonly referred to as a "GAP" process.

The term "added binder" as used herein, refers to natural or synthetic substances or energy forms added or applied to pretreated biomass to improve stability and quality of a biomass particulate, comprised of a plurality of loose biomass fibers compressed to form a single particulate product, such as a pellet. Examples of commonly added binders include, but are not limited to, heat, steam, water, air, corn starch, lignin compounds, lignite, coffee grounds, sap, pitch, polymers, salts, acids, bases, molasses, organic compounds, urea, and tar. Specialty additives are also used to improve binding and other pellet properties such as color, taste, pH stability, and water resistance. A binder may be added to the pretreated biomass at any time before, during or after a pelleting process. The amount of added binder may vary depending on the substrate being densified. Typically, the amount of added binder is about one to ten pounds per ton of loose biomass. Added binder in the form of added energy is typically in the form of convective or conducted heat in the range of 90 to 160° C., although radiated heat may also be used for the same purpose. The heat can be added outright, but heat added as a result of the heat of friction developed in the pelleting equipment during operation, is not "added binder."

The term "particulate" as defined herein refers to solid biomass dividable into separate pieces, which can range from small microscopic particles (larger than powders) up to large objects, such as bricks, or larger, such as hay bales or larger, with any suitable mass. The specific geometry and mass will depend on a variety of factors including the type of biomass used, the amount of compression used to create the particulate, the desired length of the particulate, and the particular end use.

The term "pellet" is used interchangeably herein with the term "briquette." More common nomenclature currently in use utilizes the term "briquette" to refer to a compressed particulate (e.g., Example 1) and the term "pellet" to refer to an extruded particulate (e.g., Example 4), i.e., a compressed particulate formed with a shaping process in which material is forced through a die.

The term "flowability" as used herein refers to the ability of particulates to flow out of a container using only the force of gravity. A product having increased flowability, therefore, would flow out of the container at a faster rate as compared to a product having lower flowability.

Nearly all forms of ligno-cellulosic biomass, i.e., plant biomass, such as monocots, comprise three primary chemical fractions: hemicellulose, cellulose, and lignin. Hemicellulose is a polymer of short, highly-branched chains of mostly five-carbon pentose sugars (xylose and arabinose), and to a lesser extent six-carbon hexose sugars (galactose, glucose and mannose). Dicots, on the other hand, have a high content of pectate and/or pectin, which is a polymer of alpha-linked glucuronic acid. Pectate may be "decorated" with mannose or rhamnose sugars, also). These sugars are highly substituted with acetic acid.

Because of its branched structure, hemicellulose is amorphous and relatively easy to hydrolyze (breakdown or cleave) to its individual constituent sugars by enzyme or dilute acid treatment. Cellulose is a linear polymer of glucose sugars, much like starch, which is the primary substrate of corn grain in dry grain and wet mill ethanol plants. However, unlike starch, the glucose sugars of cellulose are strung together by β-glycosidic linkages which allow cellulose to form closely-associated linear chains. Because of the high degree of hydrogen bonding that can occur between cellulose chains, cellulose forms a rigid crystalline structure that is highly stable and much more resistant to hydrolysis by chemical or enzymatic attack than starch or hemicellulose polymers. Lignin, which is a polymer of phenolic molecules, provides structural integrity to plants, and remains as residual material after the sugars in plant biomass have been fermented to ethanol. Lignin is a by-product of alcohol production and is considered a premium quality solid fuel because of its zero sulfur content and heating value, which is near that of sub-bituminous coal.

Typically, cellulose makes up 30 to 50% of residues from agricultural, municipal, and forestry sources. While cellulose is more difficult to convert to ethanol than hemicellulose, it is the sugar polymers of hemicellulose which can be more readily hydrolyzed to their individual component sugars for subsequent fermentation to ethanol. Although hemicellulose sugars represent the "low-hanging" fruit for conversion to ethanol, the substantially higher content of cellulose represents the greater potential for maximizing alcohol yields, such as ethanol, on a per ton basis of plant biomass.

As noted above, the hemicellulose fraction of biomass contains hexose and pentose sugars, while the cellulose fraction contains glucose. In current AFEX™ pretreatment operations, only limited hemicellulose conversions are obtained. It is further known that of the sugars extracted, about 30 to 35% is xylose and about 35 to 40% is glucose (most all of which is currently converted only in post-pretreatment steps). Overall conversions, as well as over-all ethanol yields, will vary depending on several factors such as biomass type, pretreatment type, and so forth.

Conventional methods used to convert biomass to alcohol include processes employing a concentrated acid hydrolysis pretreatment, a two-stage acid hydrolysis pretreatment as well as processes employing any known conventional pretreatment, such as hydrothermal or chemical pretreatments, followed by an enzymatic hydrolysis (i.e., enzyme-catalyzed hydrolysis) or simultaneous enzymatic hydrolysis and saccharification. Such pretreatment methods can include, but are not limited to, dilute acid hydrolysis, high pressure hot water-based methods, i.e., hydrothermal treatments such as steam explosion and aqueous hot water extraction, reactor systems (e.g., batch, continuous flow, counter-flow, flow-through, and the like), AFEX™, ammonia recycled percolation (ARP), lime treatment and a pH-based treatment.

Several of these methods generate nearly complete hydrolysis of the hemicellulose fraction to efficiently recover high yields of the soluble pentose sugars. This also facilitates the physical removal of the surrounding hemicellulose and lignin, thus exposing the cellulose to later processing. However, most, if not all, pretreatment approaches do not significantly hydrolyze the cellulose fraction of biomass.

In one embodiment, an ammonia fiber expansion method (AFEX™) pretreatment is used as defined herein. See also, for example, U.S. Pat. Nos. 6,106,888 ('888), 7,176,176 ('176), 5,037,663 ('663), and 4,600,590 ('590), each of which is hereby incorporated by reference in its entirety.

In one embodiment, biomass is heated to a temperature of from about 60° C. to about 100° C. in the presence of concentrated ammonia. See, for example, Dale, B. E. et al., 2004, *Pretreatment of corn stover using ammonia fiber expansion (AFEX™)*, Applied Biochem, Biotechnol. 115: 951-963, which is incorporated herein by reference in its entirety. A rapid pressure drop then causes a physical disruption of the biomass structure, exposing cellulose and hemicellulose fibers, without the extreme sugar degradation common to many pretreatments.

Nearly all of the ammonia can be recovered and reused while the remaining ammonia serves as nitrogen source for microbes in fermentation. In one embodiment, about one (1) to two (2) wt % of ammonia remains on the pretreated biomass.

Additionally, since there is no wash stream in the process, dry matter recovery following an AFEX™ treatment is essentially quantitative. This is because AFEX™ is basically a dry to dry process.

AFEX™ treated biomass is also stable for longer periods (e.g., up to at least a year) than non-AFEX™ treated biomass and can be fed at very high solids loadings (such as at least about 40%) in enzymatic hydrolysis or fermentation process as compared with dilute acid or other aqueous pretreatments that cannot easily exceed 20% solids.

Cellulose and hemicellulose are also well-preserved in an AFEX™ process, showing little degradation. As such, there is no need for neutralization prior to enzymatic hydrolysis of AFEX™ treated biomass. Enzymatic hydrolysis of AFEX™ treated biomass also produces clean sugar streams for subsequent fermentation.

Degradation products from AFEX™ treated biomass have also been identified and quantified. One such study compared AFEX™ and acid-pretreated corn stover using LC-MS/GC-MS techniques. In acid-pretreated feedstock, over 40 major compounds were detected, including organic acids, furans, aromatic compounds, phenolics, amides and oligosaccharides. AFEX™ pretreatment performed under mild alkaline condition produced very little acetic acid, HMF, and furfural. See, Dale, B. E. et al., 2004, supra, and Dale, B. E. et al, 2005b, *Pretreatment of Switchgrass Using Ammonia Fiber Expansion (AFEX™)*, Applied Biochemistry and Biotechnology. Vol. 121-124 . pp. 1133-1142. See also Dale, B. E. et al., 2005a. *Optimization of the Ammonia Fiber Explosion (AFEX™) Treatment Parameters for Enzymatic Hydrolysis of Corn Stover*, Bioresource Technology . Vol. 96, pp. 2014-2018.

In one embodiment, a modified AFEX™ pretreatment process is used as described in Example 1 . In this method, gaseous ammonia is used, which condenses on the biomass itself.

In one embodiment, AFEX™ pretreatment conditions are optimized for a particular biomass type. Such conditions include, but are not limited to, ammonia loading, moisture content of biomass, temperature, and residence time. In one embodiment, corn stover is subject to an AFEX™ pretreatment at a temperature of about 90° C., ammonia: dry corn stover mass ratio of 1:1, moisture content of corn stover of 60% (dry weight basis, (dwb)), and residence time (holding at target temperature), of five (5) min. In one embodiment, switchgrass is subjected to an AFEX™ pretreatment at a temperature of about 100° C., ammonia loading of 1:1 kg of ammonia: kg of dry matter, and 80% moisture content (dwb) at five (5) min residence time.

Hydrolysis results of AFEX™ treated and untreated samples show 93% vs. 16% glucan conversion, respectively. The ethanol yield of optimized AFEX™ treated switchgrass was measured to be about 0.2 g ethanol/g dry biomass, which is 2.5 times more than that of the untreated sample. See Dale, B. E. et al., 2005b, supra.

In one embodiment, approximately 98% of the theoretical glucose yield is obtained during enzymatic hydrolysis of an AFEX™ treated corn stover using 60 filter paper units (FPU) of cellulase enzyme/g of glucan (equal to 22 FPU/g of dry corn stover).

Ethanol yield has been shown to increase by up to 2.2 times over that of an untreated sample. In one embodiment, lower enzyme loadings of 15 and 7.5 FPU/g of glucan do not significantly affect the glucose yield, as compared with 60 FPU. In this embodiment, differences between effects at different enzyme levels decreased as the treatment temperature increased. See, for example, Dale, B. E. et al., 2004, supra; and Dale, B. E. et al., 2004, supra.

Optimal AFEX™ pretreatment conditions for hydrolysis and fermentation of switchgrass and corn stover are also discussed in Dale, B. E. et al., 2004, supra; Dale, B. E. et al, 2005b, supra; and Dale, B. E. et al., 2005b, supra.

In one embodiment, a modified AFEX™ pretreatment with significantly reduced ammonia loadings and lower required concentrations of ammonia is used. See Elizabeth (Newton) Sendich, et al., *Recent process improvements for the ammonia fiber expansion (AFEX™) process and resulting reductions in minimum ethanol selling price*, 2008, Bioresource Technology 99: 8429-8435 and U.S. Patent Application Publication No. 2008/000873 to Dale, B. E.

In one embodiment, steam is used as a pretreatment instead of or in addition to an AFEX™ treatment. However, steam tends to reduce availability of sugars, thus reducing the overall quality of animal feed. Regardless, steam remains a viable optional embodiment for pretreatment. When biomass is being pelletized, the pellets themselves typically become hot. Additionally, water is oftentimes added to bring the biomass up to a desired moisture content, such as between about 10 and 20%, such as about 12 and 18%, such as around 15%±1%. As such, steam typically develops prior to and during an AFEX™ pretreatment anyway. Addition of additional steam may allow water to be distributed evenly through the pellet. When the pelletization process is complete, steam will evaporate off and leave a pellet that is sufficient dry, i.e., typically about five (5) to 20% moisture, although the invention is not so limited.

Although a non-volatile base, such as sodium hydroxide, may also be used to move the lignin to the surface, the sodium hydroxide which remains after evaporation may negatively impact further application of the treated material, such as for animal feed and other applications.

Due to temperatures reaching the glass transition temperature of the oligomers within the fiber (e.g., lignin, hemicelluloses), pretreatments, such as AFEX™ (and/or steam) also transfers these oligomers (primarily lignin), and in some embodiments, an amount of hemicellulose, to the surface. Once on the surface, the lignin and hemicellulose are tacky. Surprisingly, these oligomers (lignin or lignin and hemicellulose) contain sufficient tackiness to provide properties at least comparable to an added binder (as the term is defined herein). As such, the inventors have discovered there is no need to cure the pretreated biomass (e.g., with heat) prior to forming them into pellets. Additionally surprising and unexpected is the discovery that there is no need to add binder in any form to produce pellets having properties at least as good as, if not better than, conventional pellets containing binder. The ability to omit the step of adding curing and/or adding binding further provides significant costs savings during production, leading to a product which is not only environmentally green but highly economical and transportable, including transportation by conventional means.

In one embodiment, the densification device utilizes a gear mesh system to compress biomass through a tapering channel between adjacent gear teeth. This densification device operates at temperatures less than 60° C. (See Example 2). In one embodiment energy consumption is minimized and physical and downstream processing characteristics are optimized.

In one embodiment, an alternative pelleting device is used to form more conventional cylindrically-shaped pellets (See Example 4).

In one embodiment, an integrated biomass pretreatment and densification process is provided. In a particular embodiment, an ammonia fiber expansion (AFEX™) pretreatment is used in conjunction with a compaction process to produce densified biomass particulates (hereinafter called "pellets"), in a process requiring no added binder.

In one embodiment, the pellets have an inherent density of at least ten (10) times that of baled biomass (which itself is about 192.2 to about 240.28 kg/m$^3$ (about 12to about 15lb/ft3)).

Use of an integrated process as described herein eliminates the need for further pretreatment at the processing plant and further minimizes the distance that low density feedstock bales need to be transported.

In one embodiment, densified pellets are transported to centralized processing facilities using existing transportation and handling infrastructure used for grains.

In one embodiment, AFEX™ conditions are optimized according to the type of biomass being processed to enhance binding properties and increase hydrolysis efficiency following densification and storage.

It is further expected that downstream processing characteristics will be at least as good or better than non-densified biomass in terms of hydrolysis, fermentation rates, yields, and so forth.

In one embodiment, AFEX™-biomass pellets having no added binder are provided. In contrast to conventional binder-containing pellets, the novel AFEX™ pellets described herein have a substantially smooth, non-flakey outer surface, likely due to the presence of lignin and, in some embodiments, hemicellulose, on the outer surface of the pellet, which essentially serve as a type of coating. As such, AFEX™ pellets are not susceptible to flaking (loss of mass) as with a conventional pellet which has no coating and contains removable flakes on its outer surface. In contrast to conventional pellets containing certain binders, such as water, which are dull in appearance, the novel AFEX™ biomass pellets have a shiny appearance. In some embodiments, the presence of lignin and/or hemicellulose is not restricted to the surface only, but also is found deeper inside the microscopic pores of the biomass particle. Therefore, the AFEX™ pellet may have added benefits, such as more efficient burning/co-firing with lignite coal than a conventional pellet whose added binder is chemically restricted to the surface of the biomass particle only.

The AFEX™ pellets further are less bendable and therefore tend to be straighter than conventional pellets. Surprisingly, the novel AFEX™ pellets have a harder "feel" to them (and are likely less brittle) as compared with the softer feel of a conventional pellet. Hardness tests (Example 4) reveal that the AFEX™ pellet is stronger initially before suddenly breaking. In contrast, a conventional pellet, such as a non-AFEX™ pellet, while maintaining strength for a longer time, is essentially more "squeezable" or "squishier" than the novel AFEX™ pellet (more comparable to softness of a "cigar"). In one embodiment, an AFEX™-CS pellet is at least 21% harder and demonstrates at least 20% less variability in hardness. In one embodiment, the novel AFEX™ pellets exhibit less deformation than conventional pellets (See, for example, Table 7). It is likely that AFEX™ pellets made from other types of biomass will demonstrate similar or better results.

Lignin is generally darker than other components in plant material, so the resulting material is noticeably darker in appearance than a material not substantially surrounded by lignin.

Figure 2:
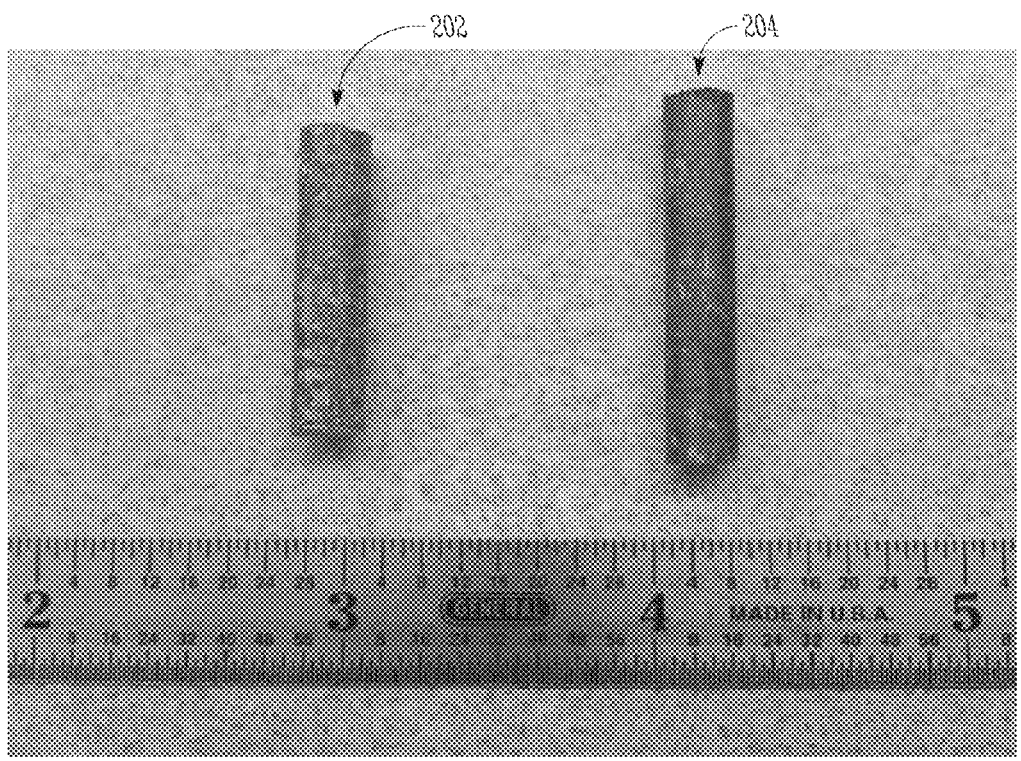
FIG. 2 comprises an image of a binder-containing non-AFEX™-CS pellet and an AFEX™-CS pellet in an embodiment of the present invention.

FIG. 2 comprises an image of a binder-containing non AFEX-CS pellet (202) and an AFEX-CS pellet (204).

In one embodiment, the AFEX™-CS pellets have a specific gravity of up to 1.16 as compared with a non-AFEX™ pellet with a specific gravity of no more than 0.87, although the invention is not so limited. As the AFEX™ pellets appear to be less porous and further demonstrate superior hardness properties as compared with conventional pellets, AFEX™ pellets are likely to show improved short and long term storage properties including, flowability, compression strength, water solubility, absorption, and overall shelf life, with reduced susceptibility to degradation due to heat, bugs, and the like.

It is also expected that the AFEX™ pellets will have an improved flowability. Further testing, as noted in prophetic examples will quantify the amount of improvement.

The resulting pellets are useful in a variety of applications, including, but not limited to, animal feed, chemical conversion, biochemical applications, electricity generating applications (e.g., burning in a boiler), fuel for biomass-burning stoves, and as a component in solid materials, such as fiberboards and extruded fibrous building materials.

The ammonia pretreatment in the various AFEX™ processes described herein dissolves a certain amount of lignin and further brings a significant amount of lignin from the interior of a plant material to the outer surface or outer edges of the fiber. As a result, the material is more easily digested by animals. In one embodiment, a combination of the novel AFEX™ pellets as described herein together with suitable additives and fillers as is known in the art produces a novel animal feed.

A blending of the novel AFEX™ pellets with coal provides a novel feed material in power plants.

The logistics of harvesting, handling, transporting, and storing low bulk density feedstocks is a significant challenge to the developing bioeconomy. Assuming a yield of 70 gal/ton, biomass baled at a density 120 kg/m$^3$ would require over ten times the volume of material for a given volume of ethanol compared with corn grain. This lower bulk density will not allow trucks to reach maximum weight capacity, further increasing the number of trucks required for feedstock supply. Biomass densification of untreated biomass through an extrusion pelleting process has been demonstrated, but at a cost that limits the ability to lower net costs for feedstock delivery.

As the bioeconomy develops, individual producers will need the flexibility to sell their biomass into the bioenergy market as economics warrant. For example, with use of regional biomass processing centers (RBPCs) (within a 5 to 10 mile area, for example), round bales may be transported using the existing infrastructure and equipment of the trucking industry. Because the RBPCs will be scaled appropriately, trucking distances for round bales will be minimized. Moreover, the presence of multiple, distributed RBPCs will minimize need for long term storage of round bales. Shorter term storage would use bale wraps and other current methods to minimize expense. With use of the novel integrated AFEX™ pretreatment/densification system described herein, densified pellets will then be more efficiently transported to centralized processing sites.

The invention will be further described by reference to the following examples, which are offered to further illustrate various embodiments of the present invention. It should be understood, however, that many variations and modifications may be made while remaining within the scope of the present invention.

EXAMPLE 1

Corn stover (CS) (everything remaining after grain is harvested, typically including stalks and leaves w/o cobs)) from a hybrid corn plant (*Zea mays* L.) grown at the Michigan State University (MSU) Agronomy Center Field was harvested in October 2007, and stored at room temperature in individual five (5) kg bags which were housed in a 30-gal trash bin. Switchgrass (SG) from the "Alamo" lowland variety of seed, *Panicum virgatum* L. grown at the Thelen Field located on Farm Lane at MSU, was harvested in October, 2005, and stored in sealed Ziploc® brand plastic bags in a freezer at four (4)° C.

The CS and SG were each subjected to an AFEX™ pretreatment comparable to the methods described in U.S. Pat. Nos. '888, '176, '663, and '590 noted above, but with certain modifications. Specifically, rather than applying liquid ammonia to the biomass and allowing the ammonia and biomass to react as in a conventional AFEX™ pretreatment, gaseous ammonia was used instead. By allowing hot ammonia gas to condense directly on cooler biomass, the ammonia and biomass become well-mixed.

The gaseous AFEX™ pretreatment was performed in the Biomass Conversion Research Laboratory at Michigan State University, East Lansing, Mich. Unless otherwise noted, standard laboratory equipment available in conventionally stocked laboratories was used. The AFEX™ pretreatment was performed in an approved ventilation hood with protective glass sash minimum face velocity of 75 feet/minute.

A Parr Instruments Model 4524 bench top reactor (hereinafter "4254 reactor") was used for this testing. The reaction chamber was first placed into the heating mantle of the 4254 reactor. A J-type T-couple temperature probe was connected to a Parr Instruments Model 4843 Modular (heat) controller (hereinafter "4843 controller") on one end and to the reaction chamber on the other end by placing the temperature probe against the internal wall of (about half-way down) the reaction chamber. The reaction chamber was then covered with a custom-fabricated circular stainless sheet metal piece having an approximately 12.7 cm (about five (5) in) diameter relief cut out for the temperature probe. The controller was turned on to low (with a red heater switch) and a J-type temperature (blue) controller showed a room temperature reading of about 25° C.±5° C.

A (yellow) K-type thermocouple (red display) and (green) Omega brand CX105 pressure connector (having offices in Stamford, Conn.) (green display) from the controller were briefly connected to test the 4254 reactor cover probes. The red display showed a room temperature reading of about 25° C.±5° C. The green display showed a one (1) atm gauge pressure reading of −0.34 to about 0.34 atm (about −5 to about 5 psig). The yellow and green connecters and 4254 reactor cover were then set aside and the blue preheat temperature was turned on to preheat the 4254 reactor to a target temperature of room temperature +20° C. The blue display was observed for about five (5) minutes to ensure that the blue temperature increased at a rate of about three (3)° C./minute.

A Sartorius MA35 moisture analyzer (Goettingen, Germany) was used to determine the moisture content of each of the biomass samples. Initial moisture measurements for the samples were typically five (5) to ten (10)% total moisture wet basis (mwb). The dry weight of each sample added to the 4254 reactor was 150 g dry weight, i.e., "dry biomass." An amount of biomass was then weighed out to result in 150 g of dry biomass (as given by the total moisture calculation). For example, for a biomass sample containing five (5) % total moisture (mwb), the following calculation would be made: x (g) of water in biomass =150 g dry biomass/(1-0.05)-150 g dry biomass). Solving for "x" results in 7.9 g of water present in the biomass.

A calculation was then made to determine the amount of deionized water to be added to each sample. For corn stover, the desired percentage of total water to dry biomass was 60%. For switchgrass, the desired value was 80%. These values were selected because they represent the optimal respective biomass moistures for maximum glucose and xylose yields from enzymatic hydrolysis after AFEX™.

Therefore, for a corn stover sample with 7.9 g of water already present, but requiring 60% (dwb) moisture, the following calculation would be made: x (g) water to be added to biomass =(0.6 * 150 g dry biomass) −7.9 g water already in biomass. Solving for "x" would result in 82.1 g of water to be added. The total weight of a 150 g (dwb) corn stover sample in this instance would be 82.1 g +7.9 g +150 g =240 g. Water was misted onto each biomass sample with a water bottle until the total weight (dry biomass (g) +water desired (g)) was achieved. The biomass was evenly coated with water by stirring the biomass.

An empty 500 ml ammonia cylinder having a 208 g maximum fill level (Parker 500 ml spun 316 Stainless steel pressure vessel (hereinafter "Parker cylinder") with high-pressure Swagelok® Series 83 two-way ball valves installed at both ends, made by Swagelok Co. (having offices in Chicago, Ill.) was weighed. Since eight (8) g was determined to be the approximate residual ammonia left in the cylinder after completion of this step, the total weight of the cylinder and ammonia required for AFEX™ pretreatment was determined by adding eight (8) g to the weight of the amount of ammonia needed.

The Parker cylinder was attached to an Airgas™ brand stock ammonia tank (with siphon tube) made by Airgas, Inc. (Radnor, PA), by opening the inlet valve on the ammonia tank, followed by opening the inlet valve on the Parker cylinder. The Parker cylinder was allowed to fill until it was cold and no more filling noise from the cylinder could be heard (elapsed time was about one (1) min). The exit valve on the ammonia tank was opened about one-quarter turn. After a few trials, it was determined that it took about 20 seconds to add 158 g of ammonia to the Parker cylinder. Thereafter, all valves were closed, starting with the exit valve of the Parker cylinder and finally the exit valve on the ammonia tank. The Parker cylinder was weighed to make sure the total weight was equal to the expected weight. Some ammonia was released under the hood if the weight was too great. When it was not enough, the above step was repeated.

The Parker cylinder, now containing ammonia, was heated by first wrapping it in BH Thermal brand Briskheat (Columbus, Ohio) heat tape and plugging in the BH Thermal brand Briskheat (Columbus, Ohio) heat tape controller. Cylinder pressure started at 0-125 psig (depending on the temperature of the ammonia inside the cylinder, as it became cold during the filling step). The Parker cylinder was heated to 600 psig (40 bar), adjustable from 400 psig (27 bar) for "colder" reactions (80° C.) to 1000 psig (70 bar) for hot reactions (160° C.). The pressure increased slowly, but always at a rate less than 0.034 atm/sec (five (5) psig/sec).

The desired biomass was then added to the reaction chamber. The (black) temperature probe was removed from the reaction chamber and placed into the slot on the side of the heater mantle that allowed the outside surface temperature of the reaction chamber to be measured. The (blue) display temperature was adjusted (using arrow keys) +20 degrees more than the original preheat to allow for the continued heating of the reaction chamber.

The cover of the reaction chamber was replaced and a funnel was added. The selected biomass sample was then poured down the funnel into the reaction chamber. Once added, the (yellow) temperature probe tip was completely covered with biomass and was observed to be about 2.54 cm (about one (1) in) from the ammonia input nozzle of the cover. The funnel was then removed, the cover returned on top of the 4254 reactor and brackets were tightened with bolts to seal it in place.

The Parker cylinder was then attached to the reaction chamber. A Welch Model 8803 vacuum pump. (Niles, Ill.) was also attached to the reaction chamber. The vacuum valve on the 4524 reactor was opened and the vacuum was turned on to pump air from the 4254 reactor for one (1) minute. The vacuum valve was closed and the vacuum was turn off. The (yellow) temperature probe and (green) pressure connector was plugged into the 4843 controller. The valve on ammonia cylinder (only) leading towards reaction chamber was opened.

The AFEX™ reaction was started by opening the 4254 reactor valve connected to the Parker cylinder. When the pressure between the Parker ammonia cylinder and the reaction chamber was equalized, the valves between the ammonia cylinder and the reaction chamber were closed (i.e., after about one (1) min). The heat tape on the Parker cylinder was also turned off. The 4843 reactor heater was left on a low setting at 20° C. above the original temperature used at preheat. After about one (1) minute the peak (red) display temperature and (green) pressure were recorded. When the (red) display temperature did not reach >100° C. within 1 minute, it meant the feedstock was not touching the temperature probe. The temperature and pressure were recorded approximately every five (5) minutes thereafter.

Starting approximately five (5) minutes before expansion step noted below, the vacuum was detached from the 4524 reaction chamber cover. The ammonia cylinder pipe was removed from the reaction chamber cover. The reaction chamber was rotated so that the 4524 pressure release valve was facing toward the back of the fume ventilation hood. The ventilation hood sash was adjusted for maximum face velocity (75 feet/minute recommended). Expansion step: Ear protection was worn. The ammonia pressure in the 4524 was released by opening the pressure release valve quickly.

The reaction chamber cover was removed. The biomass was removed and placed in a tray and left under the ventilation hood to allow ammonia vapor to volatilize. The AFEX™ biomass was allowed to air-dry over-night. The Parker cylinder was weighed to determine residual grams of ammonia applied to the biomass and the weight was recorded. The remaining ammonia (approximately 8 g) was released from the Parker cylinder inside of ventilation hood.

EXAMPLE 2

Starting Materials and Sample Preparation

Corn stover (CS) obtained from the same source as in Example 1 was used. Two samples, two (2) kg each, of each type of biomass were then subjected to the AFEX™ pretreatment according to the method described in Example 1. After pretreatment, samples were densified using a pelleting device (Federal Machine Co. d/b/a ComPAKco, LLC, Fargo, N. Dak.) to produce AFEX™ corn stover (AFEX™-CS) pellets and AFEX™ switchgrass (AFEX™-SG) pellets.

FIG. 1 shows an image of the four resulting products, which include seven (7) g of AFEX™-CS 102, 12 g of AFEX™-SG 104, a 22 g AFEX™-CS 106 pellet and a 23 g AFEX™-SG pellet 108). The AFEX™-CS and AFEX™ SG pellets, 106 and 108, respectively, had a substantially rectangular shape. Both pellets 106 and 108 were about 2.54 cm (about one (1) in) wide, about 1.27 (0.5 in) depth and about 10.16 to about 12.7 cm (about four (4) to about five (5) in) in length. (Pellet length is dependent on the particular setting use on the ComPAKco machine).

This image illustrates that just seven (7) to 12 grams of unpelleted biomass, such as AFEX™-CS 102 and AFEX™-SG 104, occupies more space than a 22 or 23 g pellet, such as AFEX™-CS pellet 106 and AFEX™-SG pellet 108. In this instance, the unpelleted biomass (102 and 104) occupies about 570 to about 980% more space than the pelleted biomass (106 and 108). FIG. 2 comprises an image of a binder-containing non-AFEX-CS pellet and an AFEX-CS pellet.

Testing Performed

Several additional samples were prepared in the manner described above and subjected to preliminary physical tests such as Angle of Repose (°) according to the method described in Carr, R. L. Jr. 1965. Evaluating flow properties of solids. *Chemical Engineering* 72(3): 163-168.

Thermal Conductivity (W/m ° C.) was determined with a thermal properties meter (KD2, Decagon Devices, Pullman, WA) that utilized the line heat source probe technique described in Baghe-Khandan, M., S.Y Choi, and M.R. Okos. 1981, *Improved line heat source thermal conductivity probe, J. of Food Science,* 46(5):1430-1432.

Water activity was measured using a calibrated water activity meter (AW Sprint TH 500, Novasina, Talstrasse, Switzerland).

Bulk density ($kg/m^3$), true density ($kg/m^3$) and porosity were determined using a multivolume pycnometer (Micromeritics model 1305, Norcross, Ga.) as described in Sahin, S. and S. G. Sumnu. 2006, *Physical properties of foods,* New York, N.Y.: Springer Science Media, LLC.

Moisture Content (% db) was determined by ASAE standard method S352.1 using ISOTEMP laboratory scale (model no: 838F, Fisher Scientific, Pittsburg, Pa.) as described in ASAE Standards. 51st ed. 2004 . S352.1: *Moisture measurement—Grain and seeds*, St. Joseph, Mich.: ASABE.

Color properties (L*, a*, b*) were measured using a spectrocolorimeter (LabScan XE, Hunter Associates Laboratory, Reston, Va.).

Roundness and sphericity were determined using an Olympus SZH10 stereo microscope with a DP digital camera, followed by image analysis of the particles by Image Pro Plus® software.

Water Solubility Index (%) and Water Absorption Index (–) were calculated using the method described in Anderson, R. A., H. F. Conway, V. F. Pfeifer, and E. L. Griffin. 1969, Gelatinization of corn grits by roll and extrusion cooking, Cereal Science Today 14(1): 4.

Results are shown in Table 1 below:

EXAMPLE 3

The purpose of this experiment was to compare hydrolysis properties of AFEX™-CS pellets as compared with AFEX™-CS biomass (i.e., unpelleted).

Starting Materials

Corn stover (CS) obtained from the same source as in Example 1 was used. An AFEX™ pretreatment was performed on the CS in the same manner as described in Example 1. Pellets were made according to the method described in Example 2.

Tested samples included 1.7 g of AFEX™-CS biomass, a 1.6 g AFEX™-CS pellet, and a 2.2 g AFEX™-CS soaked in

TABLE 1

Physical Properties of AFEX ™-CS and SG vs. AFEX ™-CS and AFEX ™-SG Pellets*

| Biomass type | AoR (°) | TC (W/m° C.) | aw (—) | BD (kg/m³) | Porosity (—) | TD (kg/m³) | MC (% dwb) | Color L* | a* | b* | Roundness (—) | Sphericity (—) | WAI (—) | WSI (%) |
|---|---|---|---|---|---|---|---|---|---|---|---|---|---|---|
| AFEX ™ switchgrass pellets | 57.4a | 0.035b | 0.575c | 547.2a | 0.487 | 918a | 13.9b | 21.7b | 2.21c | 6.47b | 0.56a | 0.64a | 6.30b | 6.74a |
| AFEX ™ switchgrass biomass | 56a | 0.055a | 0.787a | b— | 0.640a | c— | 29.3a | 17.8c | 2.20c | 5.94b | 0.635a | 0.52c | 6.17b | 6.14a |
| AFEX ™ Corn stover pellets | 60.6a | 0.04ab | 0.451b | 549.2a | 0.376b | 722b | 7.41c | 21.5b | 3.14b | 6.70b | 0.45b | 0.6b | 7.14ab | 4.36a |
| AFEX ™ corn stover biomass | 54.4a | 0.045ab | 0.672b | b— | 0.657a | c— | 16.7b | 24.2a | 3.69a | 8.81a | 0.56a | 0.61ab | 8.03a | 5.63a |

*Similar letters for a given property is not significantly different at α = 0.05
n = 2 for all the properties analyzed
AoR—Angle of Repose (°);
TC—Thermal Conductivity (W/m° C.);
aw—Water activity (—);
BD—Bulk density (kg/m³);
TD—True Density (kg/m³);
MC—Moisture Content (% db);
L* - Brightness or luminosity;
a* - redness or greenness;
b* - yellowness or blueness;
WAI—Water Absorption Index (—);
WSI—Water Solubility Index (%)

Conclusion

The AFEX™-CS pellets (e.g., 106) and AFEX™-SG pellets (e.g., 108), had a relatively smooth surface and held together well during handling. The AFEX™ pellets of both the corn stover and switchgrass possess lower porosity, water adsorption index, water activity, and moisture content as compared to the non-pelleted AFEX™ samples. Such properties are an indication of improved storability for the pelleted biomass. Lower porosity, higher bulk density and higher true density of the pellets are also indicative of reduced shipping costs.

The pellets exhibited other desirable properties as shown in Table 1. In particular, the pellets demonstrated a high angle of repose. A pellet's angle of repose is defined as the angle between the horizontal and the plane of contact between two pellets when the upper pellet is just about to slide over the lower. This is also known as angle of friction. Therefore, particles have an expected value of 45 degrees. Both the corn stover pellets and switchgrass pellets tested herein exhibited higher than expected angles of repose of 57.4 and 60.6, respectively, as shown in Table 1. These values are likely related to the pellets' substantially rectangular geometry.

100 ml amount of de-ionized water at 25° C. for five (5) minutes before hydrolysis to produce a soaked AFEX™-CS pellet.

Procedure

After being placed in a 500 ml beaker, an enzymatic hydrolysis was performed on each sample according to a standard laboratory protocol at one (1)% solids loading. See, for example, Shishir P. S. Chundawat, Balan Venkatesh, Bruce E. Dale, 2005, Effect of particle size based separation of milled corn stover on AFEX™ pretreatment and enzymatic digestibility, Biotechnology and Bioengineering, Vol. 96, Issue 2, pp 219-231.

Fifteen Filter Paper Units (FPU) of an enzyme, specifically Spezyme® CP (Genencor®, a Danisco Division, having offices in Rochester, N.Y. whole cellulose, was added. The samples were incubated at 50° C. in a New Brunswick incubator Innova 44, (Edison, N.J.) while being shaken at 150 RPM within the incubator. Observations and samples were taken at 6 hrs, 24 hrs and 72 hrs incubation time.

Results

Figure 3A:
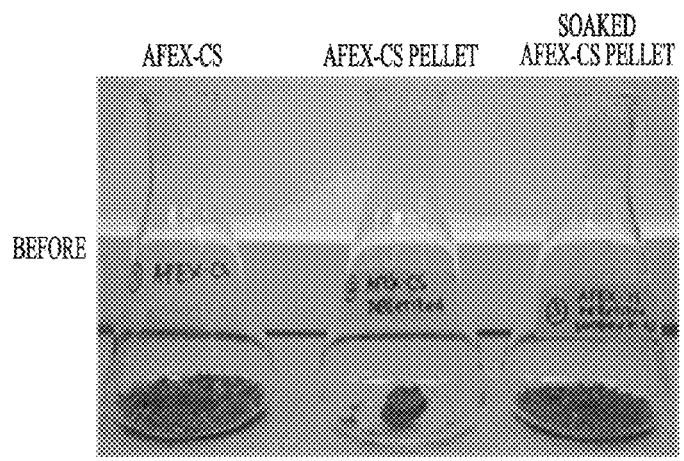
FIGS. 3A-3E are images taken at various times of three biomass samples, including AFEX™-CS, AFEX™-CS pellets, and soaked AFEX™-CS pellets in embodiments of the present invention.
Figure 3B:
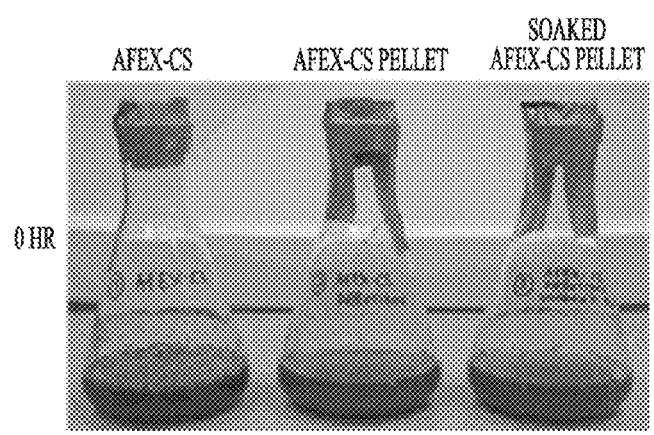
Figure 3C:
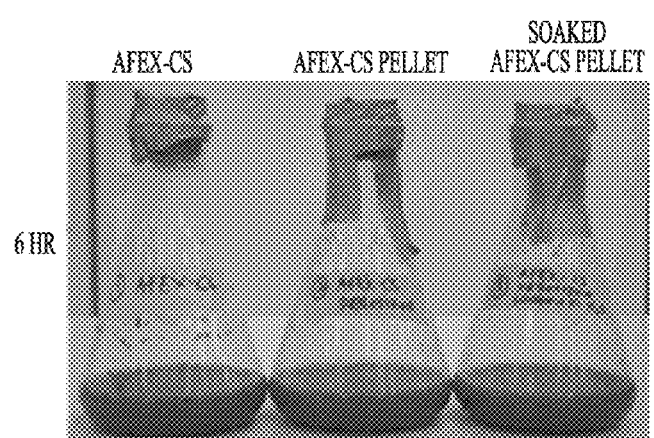
Figure 3D:
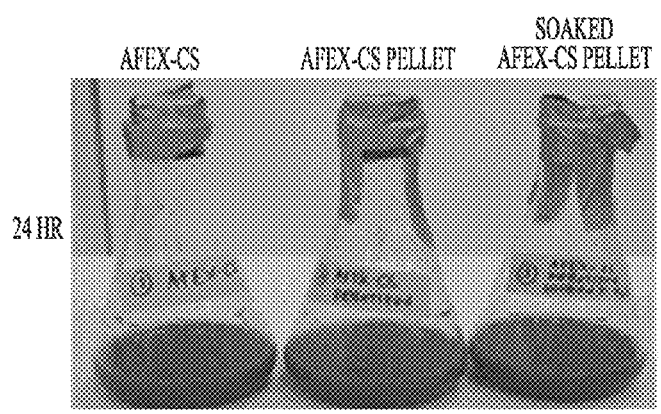

A visual inspection of the resulting hydrolysates indicates that each of the three samples completely dissolved immediately upon water addition (FIG. 3B). Therefore, it is apparent that all three samples hydrolyzed to substantially the same extent in substantially the same amount of time.

Approximately two (2) ml samples were taken from the incubator were filtered and run through a Shimadzu high pressure liquid chromatographer (HPLC) Model LC-2010HT w/ELSD-LT to determine glucan and xylan conversions.

Figure 3E:
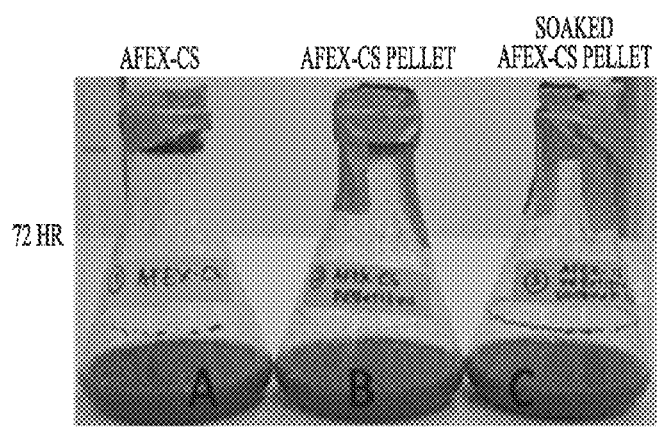
Figure 4:
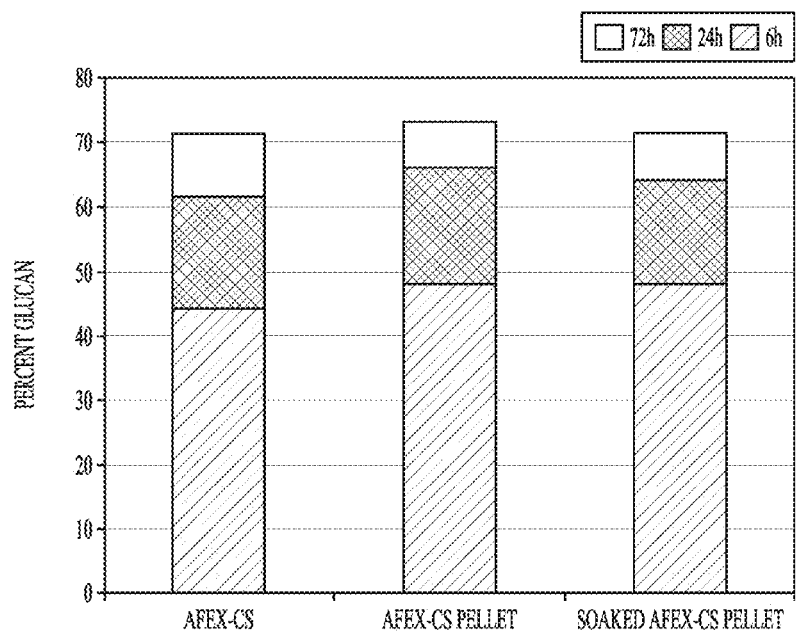
FIG. 4 is a graph show % glucan conversion versus biomass at 6 hr, 24 hr and 72 hr for the biomass samples shown in FIGS. 3C-3E in embodiments of the present invention.
Figure 5:
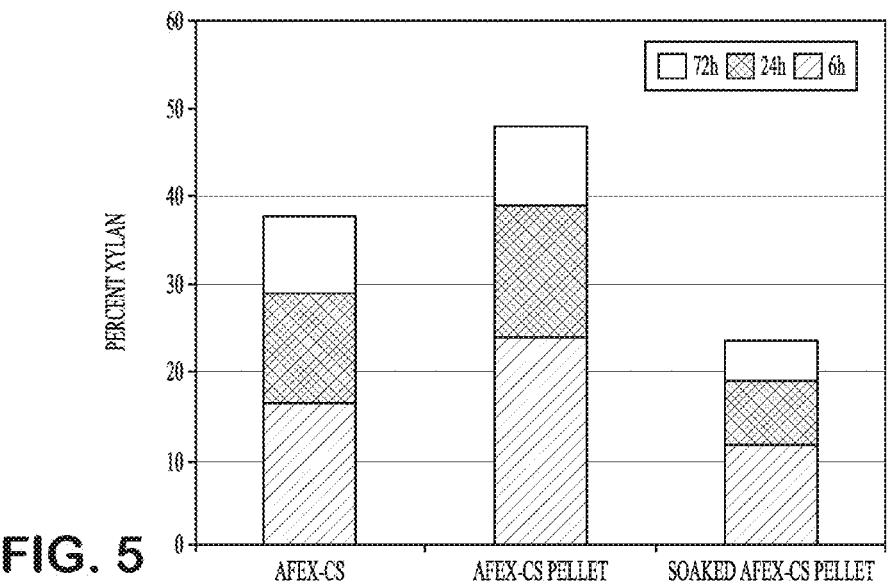
FIG. 5 is a graph show % xylan conversion versus biomass at 6 hr, 24 hr and 72 hr for the biomass samples shown in FIGS. 3C-3E in embodiments of the present invention.

FIGS. 3A-3E are images taken at various times of three biomass samples, including AFEX-CS, AFEX-CS pellets, and soaked AFEX-CS pellets. FIGS. 4A and 4B are comparative hydrolysis graphs showing glucan conversions of the samples shown in FIGS. 3A-3E. As can be seen, the glucan conversions remain substantially the same across each sample.

Table 2 shows percent of glucan converted to glucose at various times in each of the samples.

TABLE 2

Percent of Glucan Converted to Glucose

| Biomass type | % glucan conversion (to glucose) 6 h | % glucan conversion (to glucose) 24 h | % glucan conversion (to glucose) 72 h |
|---|---|---|---|
| AFEX ™ CS | 44.3 | 61.7 | 71.4 |
| AFEX ™ CS-Pellet | 48.3 | 65.9 | 73.7 |
| Soaked AFEX ™ CS-Pellet | 47.5 | 64.0 | 71.3 |

Table 3 shows the percentage of total glucose produced between samplings.

TABLE 3

Percentage of Total Glucose Produced Between Samplings

| Biomass type | % total glucose 6 h | % total glucose 24 h | % total glucose 72 h |
|---|---|---|---|
| AFEX ™ CS | 44.3 | 17.4 | 9.7 |
| AFEX ™ CS-Pellet | 48.4 | 17.5 | 7.8 |
| Soaked AFEX ™ CS-Pellet | 47.5 | 16.5 | 7.3 |

Table 4 shows percentage of total xylan converted to xylose and total xylan in each sample before hydrolysis.

TABLE 4

Percentage of Total Xylan Converted to Xylose

| Biomass Type | % xylan conversion (to xylose) 6 h | % xylan conversion (to xylose) 24 h | % xylan conversion (to xylose) 72 h | Total Xylan (g) |
|---|---|---|---|---|
| AFEX ™ CS | 16.5 | 29.7 | 37.9 | 0.42 |
| AFEX ™ CS-Pellet | 24.1 | 39.6 | 48.0 | 0.38 |
| Soaked AFEX ™ CS-Pellet | 11.8 | 19.3 | 23.4 | 0.72 |

Table 5 shows the percentage of total xylose produced between samplings.

TABLE 5

Percentage of Total Xylose Produced Between Samplings

| Biomass type | % total xylose 6 h | % total xylose 24 h | % total xylose 72 h |
|---|---|---|---|
| AFEX ™ CS | 16.5 | 13.2 | 8.1 |
| AFEX ™ CS-Pellet | 24.1 | 15.5 | 8.4 |
| Soaked AFEX ™ CS-Pellet | 11.8 | 7.5 | 4.0 |

Conclusion

The substantially instantaneous hydrolyzing (e.g., wetting and dispersion) in the AFEX™-CS pellet demonstrates that pelleting of corn stover biomass does not affect hydrolysis. It is likely that other AFEX™ pellets made from other biomass materials will behave in a similar manner. Indeed, as FIG. 3B shows, most of the biomass in each pellet is converted to sugar within six (hrs), which compares favorably with the unpelleted AFEX™-CS biomass sample. Additionally, both pellets (AFEX™-CS pellet and the soaked AFEX™-CS pellet) hydrolyzed to nearly the same extent as the unpelleted sample. This determination was made by observing the lack of solids remaining after 72 hours (FIG. 3E). Since the three samples had virtually the same conversions, the test was concluded at 72 hours. These results are confirmed in FIGS. 4A and 4B.

EXAMPLE 4

This test was performed to determine the comparative hardness between AFEX™-CS pellets and non AFEX™-CS pellets.

Starting Materials

CS obtained from the same source as described in Example 1 was used in this testing. Some of the CS was subjected to the AFEX™ pretreatment as described in Example 1. No additional treatment was performed on the AFEX™ treated biomass prior to pelleting, including no added binder and no artificial drying (any evaporation occurring in open air at room temperature is considered to be negligible during the course of the testing procedure).

The remaining portion underwent a different (non-AFEX™) procedure, which included adding approximately five (5) to ten (10) g of water per 100 g of CS to bring the moisture content of the biomass to 15% wet basis (wb) prior to pelleting.

Lodgepole pine biomass from the Driftmier Engineering Laboratory at the University of Georgia (Athens, Ga.) also underwent a similar non-AFEX™ procedure, and because the biomass moisture was measured to be greater than 15%, it was put in a dryer until it was at 12-15% moisture.

Ten (10) AFEX™-CS pellets and ten (10) non-AFEX™-CS pellets were formed with a Yankee Pellet Machine Model 400 (Yankee Pellet Mill, Effingham, N.H.), a centrifugal die mill which produces pellets currently considered the industry standard. Ten (10) non-AFEX™ pine pellets were pelletized using a California Pellet Machine, Model CL (CPM, Crawfordsville, Ind.).

Pellets produced on both these machines have a substantially cylindrical shape and are about six (6) mm in diameter. Length can be varied as desired, but is generally more uniform than the device used above in Example 2. For purposes of testing, the pellets were about one (1) inch.

Procedure

The pellets were tested for hardness using a 12 T Carver Laboratory Hydraulic Press/Hardness testing apparatus with 400 PSI gauge (Carver, Wabash, Ind.). Specifically, this test measured the amount of force needed to crush each pellet beyond its yield strength. The determination of "yield strength" was made through trained observation and "feel." Specifically, pressure was applied to each pellet until the tester observed and felt the pellet "give." Multiple pellets were tested and an average hardness, i.e., pressure required to cause pellets to yield (Table 6), and average deformation (Table 7) were determined Results Comparative hardness results are shown below in Table 6:

TABLE 6

Comparative Pellet Hardness for AFEX ™ and Non-AFEX ™ Pellets

| non-AFEX ™ pellets (psi) | AFEX ™ pellets (psi) | Non-AFEX ™ Pine pellet |
|---|---|---|
| 140 | 120 | 125 |
| 130 | 120 | 125 |
| 70 | 100 | 75 |
| 100 | 140 | 90 |
| 90 | 140 | 90 |
| 70 | 110 | 110 |
| 120 | 130 | 130 |
| 70 | 130 | 75 |
| 90 | 120 | 80 |

Measurements of the final diameter of each pellet after it "gave" were also made. These measurements are shown in Table 7. (Note that the data is randomized as compared with Table 6).

TABLE 7

Comparative Pellet Deformation for AFEX ™ and Non-AFEX ™ Pellets (initial diameter: 6 mm)

| non-AFEX ™ CS pellets (mm) | AFEX ™ pellets CS (mm) | Non-AFEX ™ Pine pellet (mm) |
|---|---|---|
| 5.26 | 4.66 | 5.08 |
| 4.67 | 5.28 | 5.07 |
| 4.96 | 5.28 | 5.13 |
| 4.84 | 4.98 | 5.1 |
| 5.2 | 4.73 | 5.28 |
| 5.08 | 5.18 | 4.59 |
| 4.76 | 5 | 4.75 |
| 4.15 | 5.12 | 4.61 |
| 5.39 | 5.36 | 4.98 |

The untreated, binder-added corn stover pellets average yield point was 98 psi+25 psi. The AFEX™ no binder added corn stover pellets average yield point was 119 psi+20 psi, and the non-AFEX™ binder-added pine pellet average yield point was 98 psi+23 psi.

All cylindrical pellets had a beginning diameter of 6.00 mm. The untreated, binder-added corn stover pellets average deformation at yield was 1.06 mm+0.36 mm. The AFEX™, no binder added corn stover pellets average deformation at yield was 0.95 mm+0.24 mm, and the non-AFEX™, binder-added pine pellet average deformation at yield was 1.06 mm+0.23 mm.

Conclusion

The AFEX™ pellets showed greater durability as compared to non-AFEX™ pellets. AFEX™ pellet quality is also more consistent than the non-AFEX™ pellets. As such, it is expected that any given AFEX™ pellet is less likely to be deformed or disfigured (not a cylindrical shape) as compared with a non-AFEX™ pellet.

EXAMPLE 5

This test was performed to determine the bulk density of AFEX™-CS pellets as compared to non-AFEX™ CS pellets.

AFEX™-CS pellets and non-AFEX™ CS produced according to the method described in Example 4 (about six (6) mm in diameter and about one (1) inch in length) were added to a 500 ml beaker and weighed.

The non-AFEX™-CS pellets had a bulk density of about 36 lb/ft$^3$ (553 g/L), while the AFEX™-CS pellets had a bulk density of about bout 38 lb/ft$^3$ (578 g/L).

As this preliminary test indicates, the AFEX™-CS pellets showed a higher bulk density than the non-AFEX™ CS pellets. This is likely due to their smooth non-flaky outer surface (which also is expected to improve their flowability), as compared to the rough flaky outer surface of the non-AFEX™ pellets. It is expected that a test performed on a larger scale would demonstrate an even greater difference in bulk density. Likely, the edge effects caused by the small size of the container were a significant factor in this preliminary testing.

It is also possible that pellets which are longer than the one (1) inch pellets may weigh each other down to create a higher mass at a higher density. Alternatively, shorter pellets may pack better. Additional testing (including in larger containers) will be performed to optimize pellet size, and therefore, overall bulk density, for a given application.

EXAMPLE 6

In this testing, various properties of untreated corn stover pellets were compared with AFEX™-treated corn stover pellets.

Starting Materials

Corn stover (CS) obtained from the same source as in Example 1 was used. An AFEX™ pretreatment was performed on the CS in the same manner as described in Example 1. Pellets were made according to the method described in Example 2.

Procedure

Standard procedures were followed to obtain the results shown in Tables 8 and 9. Specifically, Moisture Total: ASTM E871; Ash Content: ASTM D1102; Sulfur Content: ATSM D4239; Gross Caloric Value at Constant Volume: ASTM E711; Chlorine Content: ASTM D6721; Bulk Density: ASTM E873; Fines (Particles less than 0.32 cm (0.125 in): Twin Peaks Test CH-P-06; Durability Index: Kansas State Method; Sample above 3.8 cm (1.5 in): Twin Peaks Test CH-P-06; Maximum Length: Twin Peaks Test CH-P-06; Diameter, Range: Twin Peaks Test CH-P-05 . The tumbling method used to arrive at the durability indices noted herein is known as the "Kansas State Method." See, for example, http://pelletheat.org/pdfs/StandardSpecification-WithCopyright.pdf.

Results

The results are shown below in Tables 8 and 9:

TABLE 8

Corn Stover Pellets, Untreated

| | METHOD | UNITS | MOISTURE FREE | AS RECEIVED |
|---|---|---|---|---|
| Moisture Total | ASTM E871 | wt % | | 12.08 |
| Ash | ASTM D1102 | wt % | 4.13 | 3.63 |
| Sulfur | ASTM D4239 | wt % | 0.095 | 0.084 |
| Gross Cal. Value at Const. | ASTM E711 | Btu/lb (Btu/kg) | 8017 (17,638) | 7048 (15,506) |
| Chlorine | ASTM D6721 | mg/kg | 4218 | 3709 |
| Bulk Density | ASTM E873 | lbs/ft$^3$ (kg/m$^3$) | | 44.08 (706) |
| Fines < 0.125 in (<0.32 cm) | TPT CH-P-06 | wt % | | 0.57 |
| Durability Index | Kansas State | PDI | | 97.9 |
| Sample >1.5 in (3.8 cm) | TPT CH-P-06 | wt % | | 4 |
| Maximum Length (Single Pellet) | TPT CH-P-06 | in (cm) | | 1.6 (4.1) |
| Diameter, Range | TPT CH-P-05 | in (cm) | | 0.235-0.241 (0.597-0.612) |
| Diameter, Average | TPT CH-P-05 | in (cm) | | 0.239 (0.607) |
| Bag Weight | | lbs (kg) | | 3.5 (1.6) |

TABLE 9

Corn Stover Pellets

| | AFEX™ METHOD | UNITS | MOISTURE FREE | AS RECEIVED |
|---|---|---|---|---|
| Moisture Total | ASTM E871 | wt % | | 7.39 |
| Ash | ASTM D1102 | wt % | 4.03 | 3.73 |
| Sulfur | ASTM D4239 | wt % | 0.087 | 0.08 |
| Gross Cal. Value at Const. | ASTM E711 | Btu/lb (Btu/kg) | 7977 (17,550) | 7388 (16,254) |
| Chlorine | ASTM D6721 | mg/kg | 3484 | 3226 |
| Bulk Density | ASTM E873 | lbs/ft$^3$ (kg/m$^3$) | | 47.15 (765) |
| Fines < 0.125 in (<0.32 cm) | TPT CH-P-06 | wt % | | 0.2 |
| Durability Index | Kansas State | PDI | | 97.9 |
| Sample >1.5 in (3.8 cm) | TPT CH-P-06 | wt % | | 3.9 |
| Maximum Length (Single Pellet) | TPT CH-P-06 | in (cm) | | 1.85 (4.7) |
| Diameter, Range | TPT CH-P-05 | in (cm) | | 0.232-0.242 (0.589-0.615) |
| Bag Weight | | lbs (kg) | | 3.5 (1.6) |

Conclusion

As the results in Tables 8 and 9 show, the AFEX™ pellet has an increased gross caloric value, i.e., an AFEX™ pellet burns about 4.8% more efficiently due to the presence of less moisture in the AFEX™ pellet as compared with an untreated pellet. Specifically, the caloric increase, non-AFEX™ to AFEX™, was calculated as follows: 7,388 Btu/lb - 7048 Btu/lb =340 Btu/lb (or 748 Btu/kg); therefore % increase, non AFEX™ to AFEX™, is (340 Btu/lb)/(7048 Btu/lb) * 100% =4.8%. Additionally, bulk density increased by an average of seven (7) % and there is an approximately 65% reduction in the amount of fines (i.e., broken pieces having a diameter less than 0.125 cm) in an AFEX™ pellet bag weighing about 3.5 lb (1.6 kg) as compared with a pellet bag of untreated corn stover having approximately the same weight.

Additionally, although the "durability indices" between AFEX™ and non-AFEX™ pellets are substantially the same in this testing, the method of testing durability was a simple tumbling experiment ("Kansas State Method"), as compared with the destructive testing described in the above examples. As such, insufficient energy is provided to create the separation required to be able to properly distinguish between the pellets. Regardless, a high durability indice shows that the AFEX™ pellets are suitable for use in the pellet industry.

EXAMPLE 7 (PROPHETIC)

Samples of biomass, such as switchgrass and prairie cord grass will be collected at various maturities, and corn stover will be collected following grain harvest. Biomass composition will be determined at harvest, during storage in round bales, after initial AFEX™ processing and densification, and after storage of densified pellets. AFEX™ pretreatment will be statistically optimized for hydrolysis and binding properties based on parameters of time, temperature, biomass moisture, and ammonia to biomass ratio. AFEX™ conditions providing at least 90% of glucan conversion and 80% xylan conversion will be used to prepare materials for densification.

Densification will be performed using any suitable method, including the methods used in Examples 2 and 3.

The resulting pellets will be subjected to various environmental conditions to simulate long-term storage, and then evaluated for flowability, compression strength, water solubility, water absorption, etc. Downstream processing characteristics will be evaluated using a standardized set of hydrolysis and fermentation conditions, including separate hydrolysis and fermentation (SHF) vs. simultaneous saccharification and fermentation (SSF). In one embodiment a comparison of these properties will be made between freshly prepared pellets (i.e., within about one (1) month), stored pellets and non-densified biomass.

EXAMPLE 8 (PROPHETIC)

AFEX™ pretreatment of prairie cord grass will be statistically optimized for time, temperature, biomass moisture, and ammonia to biomass ratio. A fairly broad range of AFEX™ conditions gives similar hydrolysis results, giving us confidence that there are sets of pretreatment conditions that also enhance binding properties. AFEX™ conditions providing at least 90% of glucan conversion and 80% xylan conversion will be identified and used to prepare materials for densification. We will characterize these pretreated materials for surface properties using various methods developed in our lab (ESCA, Prussian blue staining, SEM), and will correlate those properties with the pellet density and durability.

EXAMPLE 9 (PROPHETIC)

Ten (10) kilograms each of corn stover and switchgrass will be subjected to AFEX™ pretreatment. These materials will preferably be chopped and milled into 5 different particle sizes, ranging from 850 microns to 2.5 cm prior to receipt by the supplier.

A ten (10) kg sample of this species will be used to do a statistically-optimized AFEX™ study. The optimal AFEX™ pretreatment conditions identified providing at least 90% of glucan conversion to glucose and 80% xylan conversion to xylose will be identified. These conditions will be used to prepare a 10 kg batch of AFEX™ prairie cord grass, at the varied particle sizes.

It is estimated that each kilogram of AFEX™ biomass should produce approximately forty (40) of the approximately 2.54×1.59×10.16 cm (about one (1)×0.625×four (4) in) "single-stroke" pellets. Therefore, for each biomass species, 80 AFEX™-treated pellets of each of the five biomass particle size should be obtained, for a total of 400 pellets per feedstock to be tested for durability and suitability. These AFEX™ pretreated materials will also be evaluated for their surface properties using various methods (e.g., ESCA, Prussian blue staining, SEM), and correlate those properties with the pellet density.

EXAMPLE 10 (PROPHETIC)

Operating variables will be investigated to optimize operating conditions for converting pretreated biomass into densified pellets. These variables includes AFEX™ pretreatment conditions, moisture content, particle size, die temperature versus bond strength, rate of compaction versus quality of output, energy usage, existing surface chemistry and variations, compaction ratios and resultant density, and compacted package size and shape. Attrition and wear of mechanical components will also be assessed.

EXAMPLE 11 (PROPHETIC)

Biomass pretreated using any known AFEX™ procedure or according to the procedure in Example 1 or with any other appropriate modification of an AFEX™ procedure will be densified using any suitable method, including the methods described in Examples 2 and 3.

The densified biomass will then be subjected to various environmental conditions, including temperature (25 to 40° C.), relative humidity (60 to 90%), consolidation stress (0 to 120 kPa), and storage time (0 to 6 mo). Following storage, physical characteristics will be evaluated as described below:

Flowability may be evaluated with a simple test in which a number of AFEX™-pellets are placed in a container, such as the bed of a truck and tipped to about 45 degrees. A comparison with conventional pellets may be made by noting the time it takes for the pellets to flow out of the container.

Flowability will also be evaluated using Carr Indices. See ASTM D6393. 1999, *Standard test method for bulk solids characterization by Carr indices, ASTM Standards*, W. Conshohocken. Pa. Flowability is comprehensively defined as the ability of a material to flow un-abruptly under a given environmental condition. The flowability measurement is most often done by Carr Indices, by calculating the total flowability index and total floodability index. Carr, R. L. Jr. 1965, *Evaluating flow properties of solids, Chemical Engineering* 72(3): 163-168.

A higher value to total flowability index and lower value to total floodability index will yield an ideal material with low or no flow problems. Another way to quantify flowability is by measuring the Jenike Shear Stress properties. See Jenike, A. W. 1964, *Storage and flow of Bulletin No.* 123, Utah Engineering station, Bulletin of University of Utah. Jenike's method will also be used to determine particle cohesion, yield locus, angle of internal friction, yield strength, and flow function, and particle size distribution. See ASTM D6128. 2000, *Standard Test Method for Shear Testing of Bulk Solids Using the Jenike Shear Cell, ASTM Standards*, W. Conshohocken. Pa., and ASAE S19.3. 2003, *Method of determining and expressing fineness of feed materials by sieving, ASAE Standards*. St Joseph, Mich.: ASABE.

Additionally, glucan, xylan, galactan, arabinan, mannan, lignin, ash and fiber levels will be evaluated to determine their effect on storage and flowability behavior. Furthermore, several other physical properties will be measured as indicators of poor flowability (i.e., particle size, particle shape, thermal properties, moisture properties, and color). See Selig, M, et al., 2008, *Enzymatic saccharification of lignocellulosic biomass, Technical report NREL/TP*-510-42629; Sluiter, A, B. Hames, R. Ruiz, C. Scarlata, J. Sluiter, and D. Templeton, 2008a, *Determination of ash in biomass, Technical report NREL/TP*-510-42622; Sluiter, A, B. Hames, R. Ruiz, C. Scarlata, J. Sluiter, D. Templeton, and D. Crocker. 2008b, *Determination of structural carbohydrates and lignin in biomass, Technical report NREL/TP*-510-42618.

Rheological material properties that affect the ability of biomass to be handled pre- and post-densification will be established. Such properties include, but are not limited to, bulk density, true density, compressibility, relaxation, springback, permeability, unconfined yield strength, and frictional qualities. These properties are a function of the feedstock particle size and distribution, shape factor, moisture condition, and consolidation pressure and time. Since commercial rheological testers are typically designed for use with small grains and fine powders; and consequently, do not accommodate particulate that is greater than ¼ inch in diameter, we will develop new measurement systems for characterizing larger feedstock particles. Systems include compaction and shear cells that can be scaled for various material sizes, integrated with commercial load frames, and operated over a range of consolidation pressures.

Data will be analyzed to determine conditions which lead to improved (or optimized) flowability, using formal statistical methods such as general linear models, regression, response surface analysis, multivariate analysis, and other techniques as appropriate. See Myers, H. R. 1986, *Classical and modern regression applications*, $2^{nd}$ edition. Duxbury publications, CA. USA. Draper, N. R., and Smith, H. 1998, *Applied Regression Analysis*, New York, N.Y.: John Wiley and Sons, Inc.

EXAMPLE 12 (PROPHETIC)

The impact on downstream processing, such as feedstock pretreatment, densification, and storage on bioconversion efficiency from the integrated AFEX™/densification process will be evaluated. Tests will be carried out using a standardized set of conditions for both enzymatic hydrolysis and microbial fermentation.

At least three types of biomass will be evaluated, namely corn stover, switchgrass, and prairie cord grass. For each of these feedstocks, samples of raw ground biomass, AFEX™-pretreated biomass, and AFEX™-pretreated and densified biomass (before and after storage) will be collected. Thus, 3 ×4 =12 total biomass sample types will be evaluated. Conversion trials will be conducted in 500 ml Erlenmeyer flasks containing 48 dry g biomass and 152 ml of 2 M phosphate buffer (pH 4.3). The 24% solids loading rate was selected to simulate industrial conditions. Preliminary trials have shown that AFEX™ pretreated pellets solubilize rapidly upon immersion in water, therefore grinding will not be necessary (See Example 2). At this point the pH should be 4.7-4.9, and will be adjusted to that level if necessary. To prevent bacterial contamination, 12 ml of a 10 mg/ml tetracycline stock solution will be added.

Beyond comparing the three types of feedstocks and four pretreatment combinations, conversion methods, enzyme sources, and enzyme dosage will also be compared as outlined below. Therefore, the nominal enzyme dosage of 15 FPU Spezyme® CP and 64 pNPGU Novozyme® 188 per g glucan will be compared, with a more challenging dosage of one third those rates. A similar pair of enzyme dosages will be calculated for the extremophile enzyme source.

Separate hydrolysis and fermentation (SHF) will be evaluated. For saccharification, flasks will be incubated for 48 h at 50° C. and 250 rpm in an orbital shaker. Samples will be removed at 0, 2, 4, 6, 8, 18, 24, 30, 36, and 48 hr. Flasks will then be cooled to 30° C. and inoculated with 2 ml of a 12-18 h culture of a recombinant strain of *Saccharomyces cerevisiae* which possesses pentose-fermenting capabilities grown in a medium containing two (2) g/l glucose and two (2) g/l yeast extract. Flasks will be incubated for an additional 96 h at 30° C. and 150 rpm in an orbital shaker. Samples will be removed at 0, 3, 6, 9, 18, 24, 36, 48, 60, 72, 84, and 96 hr during fermentation.

Simultaneous saccharification and fermentation (SSF) will also be performed to evaluate conversion. The main difference will be that flasks will be dosed with enzyme and immediately inoculated with yeast as noted above, then incubated for 144 hr at 30° C. Samples will be removed at 0, 2, 4, 6, 8, 18, 24, 36, 48, 60, 72, 96, 120, and 144 hr. Enzyme and biomass loadings and other conditions will be identical to those listed above.

Additionally, both SHF and SSF, replicating the conditions listed above, except for the enzyme source. Crude enzyme preparations from lignocellulose degrading extremophiles isolated from the Homestake Mine in Lead, SD, now known as the Deep Underground Science and Engineering Laboratory (DUSEL), will be used. See Bang, S., et al, 2008 . Biofuels group NSF DUSEL project [abstract]. Homestake DUSEL Spring Workshop. Talk 10 . p. 2 . These enzymes will be added in appropriate amounts to achieve comparable enzyme dosages to those above.

Samples will be analyzed for carbohydrates, organic acids, and ethanol via HPLC using a Biorad® HPX 87H column and refractive index detector. As noted previously, the AFEX™ process does not produce inhibitors such as furfural and hydroxymethyl furfural, and thus it will not be necessary to measure these. During fermentation, yeast and/or bacterial populations will be measured by hemocytometer or plate counts using potato dextrose agar. Three replications of each saccharification/fermentation will be performed for each treatment. Parameters to be calculated will include rates and yields for both saccharification and fermentation. Results will be averaged and statistically analyzed.

EXAMPLE 13 (PROPHETIC)

Techno-economic models will be developed for the AFEX™ pretreatment and densification processes of the pretreatment and densification facility. These models will be constructed using material and energy balance data collected upon completion of the aforementioned objectives and the general principles of engineering design. Both capital and operating costs will be estimated by the techno-economic model for each process. The feedstock cost will be assigned a value reflective of an informed estimate of its delivered cost. Once the costs are modeled, optimization methods, such as linear programming, will be used to minimize overall costs and determine an optimum capacity for the pretreatment and densification center facilities. The minimum feasible scale will be determined to assess the efficacy of the process for distributed adoption.

A preliminary model of the AFEX™ process will be constructed to interface with the subsequent densification process. Specifically, an AFEX™ pretreatment will be modeled as either a batch or a continuous process, depending upon the origin of the collected data. The capital and operating costs associated with feeding the AFEX™ reactor will be included in the model. AFEX™ reactors will be sized to achieve the desired capacity of pretreated biomass. Heat will be generated in the reactor as ammonia dissolves in the water present in the biomass. Additional heat will be provided by saturated steam at moderate to high pressures, either by direct injection or by indirect contact Ammonia will be recovered by steam stripping the pretreated biomass using distillation. The bottom stage of the column will produce pretreated biomass that is relatively low in ammonia concentration.

The pretreated biomass may be dried in a rotary dryer prior to compaction in the densification process. Both the ammonia-rich distillate and the volatilized gas from the rotary dryer will be combined and re-pressurized for recycle to the AFEX™ reactor. The amount of ammonia recycle is expected to comprise in excess of 95% of the ammonia needed for pretreatment. The costs of biomass, fresh ammonia feed, steam, and electricity will reflect industry values at the time the techno-economic model is constructed. Capital costs will be based upon the cost of fabrication using materials of construction that are compatible with the ammonia-biomass mixtures. All cost inputs will be adjustable to enable a subsequent sensitivity analysis. This analysis will determine the variables which are likely to result in marked increases in the cost of pretreated biomass.

Subsequently the external costs for the pretreatment and densification (P & D) facility, including transportation, storage, and material handling will be determined. The overall cost-to-benefit ratios for the proposed P & D systems will then be compared to a centralized pretreatment and processing alternative without densification in order to quantify system advantages. It is anticipated that some components, such as transportation costs and material loss, may favor the proposed distributed processing system due to reduced feedstock transportation distance. The additional processing required by the proposed distributed P & D system may increase operating and processing costs at that location, but replace similar processing costs at the centralized processing facility. Additionally, the uniformity and densification of the raw material may yield significant advantages for large-scale material handling, storage and production. Quantifying these potential advantages will be a key outcome of the proposed project.

These studies will optimize the AFEX™ process for both pretreatment and subsequent densification; develop and optimize the densification process for pellet formation; determine physical characteristics of pellets before and after storage; evaluate hydrolysis and fermentation of fresh and stored pellets; and conduct an in-depth economic and energy analysis of the process.

Techno-economic models will be developed for the AFEX™ and densification processes using data collected above. Delivered feedstock costs will be based on informed estimates. Optimization methods (e.g., linear programming) will be used to minimize overall costs and determine an optimum and minimum capacity for the pretreatment & densification facility. The analysis will then compare the regional biomass processing center (RBPC) versus traditional systems without combined pretreatment and densification.

Costs associated with pretreatment and densification of biomass in RBPC will be studied, including optimal and minimal scale of RBPCs; sensitivity analysis to elucidate the variables with greatest impact capital and operating costs; a comparison of decentralized and centralized systems; and a rationale to assist in facility location relative to main biorefinery.

Figure 6:
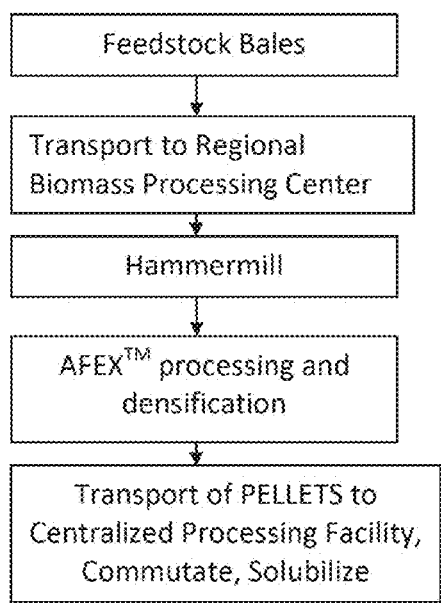
FIG. 6 is a flowchart showing a comparison of distributed and centralized processing models according to various embodiments.
Figure 6:
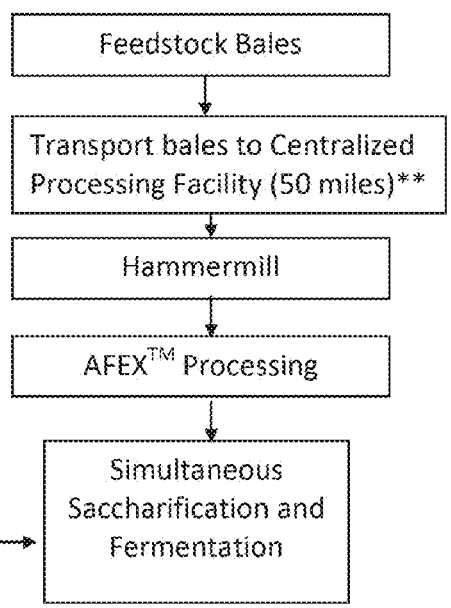

An economic model will be developed to provide decision-making capability to those adopting decentralized pretreatment and densification technology. See, for example, FIG. 6.

The logistics of harvesting, handling, transporting, and storing low bulk density feedstocks is a significant challenge to the bioeconomy. These issues are especially critical for herbaceous feedstocks, which may have low per-acre productivities. For example, biomass that yields 70 gallons of ethanol per ton, baled at a density of 120 Kg/m$^3$ would require over 10 times the volume of material for a given volume of ethanol, compared with corn grain. Therefore, biomass densification at distributed locations (to minimize transport of feedstock bales) is critically needed, but conventional extrusion pelleting of untreated biomass has proven too costly.

Novel densified biomass products and methods for making and using same are described herein. In one embodiment, an AFEX™ pretreatment is used to produce a tacky biomass which, surprisingly, is easily convertible to a solid briquette or pellet without the use of additional binder. The AFEX™ pellets are also surprisingly at least as dense and demonstrate superior hardness properties as compared with conventional pellets containing added binders.

In one embodiment, pellets comprising more than one type of biomass material (e.g., corn stover, grasses, wood, and the like) are provided. In this way, a commodity pelleted biomass product having relatively uniform properties which may be more easily adopted into the biomass processing industry, can be provided. Such properties may include, but are not limited to, BTU content, sugar content, and so forth.

Any suitable type of densification process may be used to produce products having a variety of sizes and shapes. In one embodiment, the densification process device uses a gear mesh system to compress biomass through a tapering channel between adjacent gear teeth, forming high density pellets. In one embodiment, the system operates at lower temperature, pressure, and energy requirements than comparable pelleting systems.

In one embodiment, the AFEX™ pellets "hold up" better, i.e., are more resistant to physical forces, than non-AFEX™ pellets during shipping, handling and/or storing. In one embodiment, the resulting products have an increased flowability as compared with conventional biomass solids, which allow for automated loading and unloading of transport vehicles and storage systems, as well as transport through the processing facility.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

Although specific embodiments have been illustrated and described herein, it will be appreciated by those of ordinary skill in the art that any procedure that is calculated to achieve the same purpose may be substituted for the specific embodiments shown. For example, although the process has been discussed using particular types of plant biomass, any type of plant biomass or other types of biomass or biofuels, such as agricultural biofuels, for example, may be used. This application is intended to cover any adaptations or variations of the present subject matter. Therefore, it is manifestly intended that embodiments of this invention be limited only by the claims and the equivalents thereof.

What is claimed is:

1. A process comprising:
    subjecting a quantity of plant biomass fibers to a pretreatment to cause at least a portion of lignin contained within each fiber to move to an outer surface of said fiber, wherein a quantity of pretreated tacky plant biomass fibers is produced; and
    densifying the quantity of pretreated tacky plant biomass fibers to produce one or more densified biomass particulates, wherein said biomass fibers are densified without using added binder.

2. The process of claim 1 wherein each of said densified biomass particulates has a substantially smooth, non-flakey outer surface.

3. The process of claim 1 wherein the pretreatment is a sodium hydroxide pretreatment or an ammonia pretreatment.

4. The process of claim 3 wherein the ammonia pretreatment comprises a liquid ammonia fiber expansion (AFEX) pretreatment or a gaseous AFEX pretreatment.

5. The process of claim 3 further comprising adding water and/or steam prior to and/or during the pretreatment.

6. The product of claim 1 wherein said biomass fibers contain a trace amount of base.

7. The product of claim 6 wherein the trace amount of base comprises about 1% to about 2% of ammonia.

8. The process of claim 1 wherein said biomass fibers comprise reduced lignin and/or hemicellulose levels in their interiors and increased lignin and/or hemicellulose levels on their surfaces as compared with the lignin and/or hemicellulose levels of said fibers prior to the pretreatment, wherein said surface lignin and/or hemicellulose levels provide a degree of tackiness thereon.

9. The process of claim 8 wherein said biomass fiber interiors contain microscopic pores and a portion of the lignin and/or hemicellulose is present within the microscopic pores.

10. The process of claim 9 wherein said biomass fibers are coated with lignin on their surfaces and at least some of said biomass fibers are also coated with hemicellulose.

11. The process of claim 1 wherein said densified biomass particulates have an increased resistance to deformation, an increased hardness, an increased resistance to degradation, an improved shelf life, or a combination thereof, as compared with densified plant biomass particulates containing added binder.

12. The process of claim 1 wherein said densified biomass particulates are at least 21% harder with at least 20% less variability in hardness as compared to the densified plant biomass particulates containing added binder.

13. The process of claim 1 wherein said densified biomass particulates have a substantially rectangular shape or a substantially cylindrical shape.

14. The process of claim 1 wherein said biomass fibers are corn stover fibers, switchgrass fibers, prairie cord grass fibers, or combinations thereof.

15. The process of claim 1 comprising a plurality of densified biomass particulates of a given mass having a higher bulk density than baled or loose plant biomass of the same given mass.

16. The process of claim 1 comprising a plurality of densified biomass particulates of a given number, wherein said densified biomass particulates have an increased flowability, a higher bulk density, or a combination thereof, as compared with a plurality of densified plant biomass particulates of the same given number containing added binder.

17. The process of claim 1 wherein the pretreatment is performed in a pretreatment facility, the densification is performed in a densifying facility and the method further comprises providing said densified biomass particulates to a bioproduct production facility.

18. The process of claim 17 wherein at least the pretreatment facility and densifying facility are co-located in a regional biomass process center.

19. The process of claim 18 wherein said biomass fibers include corn stover and the process further comprises providing the corn stover to the RBPC Regional Biomass Processing Center.

20. The process of claim 17 wherein the bioproduct production facility is a chemical production facility or an alcohol production facility.

21. The process of claim 17 wherein the process further comprises converting said densified biomass particulates to one or more bioproducts in the bioproduct production facility.

22. The process of claim 21 wherein the converting comprises fermenting said densified biomass particulates to produce a sugar-containing stream, wherein fermentation rates are improved as compared to fermentation rates achieved using non-densified plant biomass.

23. A product produced according to the process of claim 2.

24. A process comprising:
subjecting a quantity of plant biomass fibers to an ammonia pretreatment to cause at least a portion of lignin and/or hemicellulose contained within each fiber to move to an outer surface of said fiber to produce a quantity of pretreated tacky plant biomass fibers, wherein the ammonia pretreatment generates reduced levels of lignin and/or hemicellulose in an interior of said fiber and increased lignin and/or hemicellulose on its surface as compared with pretreatment levels of lignin and/or hemicellulose, wherein said surface lignin and/or hemicellulose has a degree of tackiness; and
densifying the quantity of pretreated tacky plant biomass fibers to produce one or more densified biomass particulates, wherein the quantity of said biomass fibers is densified without using added binder.

25. The process of claim 24 wherein the ammonia pretreatment is a liquid ammonia fiber expansion (AFEX) pretreatment or a gaseous AFEX pretreatment.

26. The process of claim 24 wherein the ammonia pretreatment comprises heating said biomass fibers to a temperature between about 60 and about 100° C.

27. The process of claim 24 wherein said densification is performed without a curing step.

28. The process of claim 24 wherein said densification comprises performing compression at a temperature less than 60° C.

29. The process of claim 24 wherein said densification comprises increasing pressure at a rate of less than 0.034 atm/sec.

30. The process of claim 24 wherein said densified biomass particulates have an increased gross caloric value as compared with densified biomass particulates containing untreated plant biomass fibers.

31. The process of claim 30 wherein said densified biomass particulate burns about 4.8% more efficiently as compared with a densified biomass particulate containing untreated plant biomass fibers.

32. The process of claim 31 wherein a given mass of a plurality of densified biomass particulates has a reduced amount of fines as compared with a plurality of densified biomass particulates of the same given mass containing untreated plant biomass fibers.

33. The process of claim 24 wherein said densification comprises forming a plurality of densified biomass particulates of a given mass having a higher bulk density than baled or loose plant biomass of the same given mass.

34. The process of claim 33 wherein said densified biomass particulates have a bulk density of between about 547.2 kg/m$^3$ and about 765 kg/m$^3$.

35. The process of claim 24 wherein said biomass fibers comprise an agricultural crop waste, a woody energy crop, a wood waste and/or a grass crop.

36. The process of claim 24 wherein said densification comprises compressing said densified biomass particulates through a tapering channel.

37. The process of claim 24 further comprising adding water and/or steam prior to and/or during the ammonia pretreatment step.

38. The process of claim 24 wherein the pretreatment and densifying steps are performed as an integrated process at a single location.

39. The process of claim 38 wherein said single location comprises a regional processing center located within about 8 to about 16 kilometers of a biomass source.

40. A product made according to the process of claim 24.

41. A process comprising using one or more densified biomass particulates in a bioproduct production facility to produce a product, wherein said densified biomass particulates are each comprised of a plurality of pretreated lignin-coated plant biomass fibers containing a trace amount of base, wherein said densified biomass particulates have a substantially smooth, non-flakey outer surface and contain no added binder.

42. The process of claim 41 wherein the bioproduct production facility is a chemical production facility or an alcohol production facility.

43. The process of claim 42 wherein said biomass fibers are corn stover fibers, switchgrass fibers, prairie cord grass fibers, or combinations thereof.

44. The process of claim 43 wherein said densified biomass particulates are fermented in the bioproduct production facility and fermentation rates are improved as compared to fermentation rates achieved using non-densified plant biomass.

45. The process of claim 44 wherein the product is an agricultural biofuel.

46. The process of claim 45 wherein the agricultural biofuel is ethanol and said biomass fibers comprise corn stover.

* * * * *

UNITED STATES PATENT AND TRADEMARK OFFICE
CERTIFICATE OF CORRECTION

PATENT NO. : 9,039,792 B2  
APPLICATION NO. : 13/835766  
DATED : May 26, 2015  
INVENTOR(S) : Bruce E. Dale, Bryan Ritchie and Derek Marshall Page 1 of 1

It is certified that error appears in the above-identified patent and that said Letters Patent is hereby corrected as shown below:

On the Title Page, item (56) References Cited:
Page 4/Other Publications/Col. 2/Line 23-24: Error reads as "Transiation." and should read as "Translation."
Page 4/Other Publications/Col. 2/Line 29: Error reads as "Jun. 14," and should read as "Jun. 10,"
Page 5/Other Publications/Col. 1/Line 8: Error reads as "Strutural Carohydrates" and should read as "Structural Carbohydrates"
Page 5/Other Publications/Col. 1/Line 9: Error reads as "Enegy" and should read as "Energy"
Page 5/Other Publications/Col. 1/Line 23: Error reads as ""SuriOpta" and should read as ""SunOpta"
Page 5/Other Publications/Col. 2/Line 19: Error reads as "Lignoceitulosic" and should read as "Lignocellulosic"
Page 7/Other Publications/Col. 1/Line 19: Error reads as "Biotechnolology," and should read as "Biotechnology,"
Page 7/Other Publications/Col. 2/Line 50: Error reads as "Accesibility" and should read as "Accessibility"

In the Specification:
Col. 9/Line 40: Error reads as "12to" and should read as "12 to"
Col. 14/Line 67: Error reads as "Pittsburg," and should read as "Pittsburgh,"
Col. 19/Line 54: Error reads as "AFEX™ no" and should read as "AFEX™, no"
Col. 20/Line 55: Error reads as "ATSM" and should read as "ASTM"
Col. 24/Line 25: Error reads as "floodability" and should read as "flowability"
Col. 24/Line 29: Error reads as "floodability" and should read as "flowability"
Col. 25/Line 29: Error reads as "3 ×4" and should read as "3×4"
Col. 26/Line 52: Error reads as "contact" and should read as "contact."

In the Claims:
Col. 28/Line 64: Error reads as "The product" and should read as "The process"
Col. 28/Line 66: Error reads as "The product" and should read as "The process"

Signed and Sealed this  
Twenty-seventh Day of October, 2015

Michelle K. Lee  
*Director of the United States Patent and Trademark Office*